United States Patent
Herath et al.

(10) Patent No.: US 11,336,328 B2
(45) Date of Patent: May 17, 2022

(54) METHOD AND APPARATUS FOR NON-ORTHOGONAL MULTIPLE ACCESS COMMUNICATION

(71) Applicant: Huawei Technologies Co., Ltd., Shenzhen (CN)

(72) Inventors: Sanjeewa Herath, Ottawa (CA); Alireza Bayesteh, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 16/699,412

(22) Filed: Nov. 29, 2019

(65) Prior Publication Data
US 2020/0186189 A1   Jun. 11, 2020

Related U.S. Application Data

(60) Provisional application No. 62/776,221, filed on Dec. 6, 2018.

(51) Int. Cl.
*H04B 1/7143* (2011.01)
*H04L 27/26* (2006.01)
(Continued)

(52) U.S. Cl.
CPC ......... *H04B 1/7143* (2013.01); *H04L 1/0003* (2013.01); *H04L 1/203* (2013.01); *H04L 5/0005* (2013.01); *H04L 27/2614* (2013.01)

(58) Field of Classification Search
None
See application file for complete search history.

(56) References Cited

U.S. PATENT DOCUMENTS

| | | | | |
|---|---|---|---|---|
| 2013/0223482 A1* | 8/2013 | Pourahmadi | ........ | H04L 27/2601 375/146 |
| 2016/0056983 A1* | 2/2016 | Jeng | ........................ | H04B 1/04 375/302 |

(Continued)

FOREIGN PATENT DOCUMENTS

| | | |
|---|---|---|
| CN | 108880756 A | 11/2018 |
| WO | 2018008406 A1 | 1/2018 |

OTHER PUBLICATIONS

NTT Docomo, Inc. NOMA scheme with user grouping 3GPPTSG RAN WGI Meeting AH 1801, R1-1800686 ,Jan. 26, 2018(Jan. 26, 2018),total 6 pages.

(Continued)

*Primary Examiner* — Adnan Baig
(74) *Attorney, Agent, or Firm* — Slater Matsil, LLP

(57) ABSTRACT

According to aspects of the disclosure, there is provided a method for a UE to select or be assigned or configured with a spreading sequence that is based on one or more communication parameters such as receiver type, receiver capability, SE, TBS, MCS, traffic load, PAPR requirement, MCL, number of layers, overloading, reliability requirement, transmission power consumption, number of active UEs, and transmission latency constraint, etc. In some embodiments, the spreading sequence may be related to a performance metric associated with an above parameter (PAPR, BLER, etc.). In some embodiments, this is achieved by associating spreading sequences with parameters or performance metrics, or both. In some instances the spreading sequences may be arranged or ordered in a manner to reduce signaling overhead (e.g., signaling an index is more efficient than signaling a value of a metric, and ordering correlates the index to the value).

20 Claims, 13 Drawing Sheets

| | Sequence Index | | | |
|---|---|---|---|---|
| Group Index | 1 | 2 | ... | M |
| 1 | $S_{11}$ | $S_{12}$ | ... | $S_{1M}$ |
| 2 | $S_{21}$ | $S_{22}$ | ... | $S_{2M}$ |
| ⋮ | ⋮ | ⋮ | ⋮ | ⋮ |
| N | $S_{N1}$ | $S_{N2}$ | ... | $S_{NM}$ |

→ $f(.)$ Increasing

(51) Int. Cl.
*H04L 1/20* (2006.01)
*H04L 1/00* (2006.01)
*H04L 5/00* (2006.01)

(56) References Cited

U.S. PATENT DOCUMENTS

2019/0200378 A1* 6/2019 Ko .................. H04W 72/042
2019/0229843 A1 7/2019 Yoshimoto et al.
2020/0343937 A1* 10/2020 Mu .................. H04B 1/7103

OTHER PUBLICATIONS

ZTE Contention-based non-orthogonal multiple access for ULmMTC 3GPP TSG RAN WGI Meeting #85, R1-164269, May 27, 2016(May 27, 2016), total 6 pages.
"3rd Generation Partnership Project; Technical Specification Group Radio Access Network; Study on Non-Orthogonal Multiple Access (NOMA) for NR (Release 16)". Technical specification. 3GPP TR 38.812 V16.0.0. Dec. 2018, 134 pages.

* cited by examiner

| Group index | Sequence index | | | |
|---|---|---|---|---|
| | 1 | 2 | 3 | 4 |
| 1 | [1,1,1,1] | [1,j,-1,-j] | [1,-j,-1,j] | [1,-1,1,-1] |
| 2 | [1,1,-1,-1] | [1,-1,-1,1] | [1,-j,1,-j] | [1,j,1,j] |
| 3 | [1,1,-j,-j] | [1,-1,-j,j] | [1,-j,-1,-1] | [1,j,j,-1] |
| 4 | [1,1,-j,j] | [1,-1,-j,-j] | [1,-j,1,1] | [1,j,-j,-1] |
| 5 | [1,-j,1,j] | [1,j,1,-j] | [1,1,1,1] | [1,-1,-1,1] |
| 6 | [1,-j,-1,j] | [1,j,-1,-1] | [1,1,-1,1] | [1,-1,1,1] |
| 7 | [1,-j,-j,-1] | [1,j,-j,1] | [1,1,j,-j] | [1,-1,j,j] |
| 8 | [1,-j,j,1] | [1,j,j,-1] | [1,1,-j,j] | [1,-1,-j,-j] |
| 9 | [1,1,1,-j] | [1,-1,1,j] | [1,-j,1,1] | [1,j,-1,-1] |
| 10 | [1,1,1,j] | [1,-1,1,-j] | [1,-j,-1,j] | [1,j,1,-j] |
| 11 | [1,1,-1,j] | [1,-1,-1,-j] | [1,-j,j,-1] | [1,j,j,1] |
| 12 | [1,1,-1,-j] | [1,-1,-1,j] | [1,-j,-j,1] | [1,j,-j,-1] |
| 13 | [1,-j,1,-1] | [1,j,1,1] | [1,1,1,j] | [1,-1,-1,-j] |
| 14 | [1,-j,-1,1] | [1,j,-1,-j] | [1,1,j,1] | [1,-1,1,-j] |
| 15 | [1,-j,-j,j] | [1,j,-j,-j] | [1,1,-j,-1] | [1,-1,-j,1] |
| 16 | [1,-j,j,-j] | [1,j,j,j] | [1,1,-j,-1] | [1,-1,-j,-1] |

FIG. 8

$$\underbrace{\left[\begin{array}{c}1\\2\\0\\0\end{array}\right], \left[\begin{array}{c}2\\-1\\0\\0\end{array}\right], \left[\begin{array}{c}0\\0\\1\\2\end{array}\right], \left[\begin{array}{c}0\\0\\2\\-1\end{array}\right]}_{\text{Group 1}} \quad \underbrace{\left[\begin{array}{c}1\\0\\2\\0\end{array}\right], \left[\begin{array}{c}2\\0\\-1\\0\end{array}\right], \left[\begin{array}{c}0\\1\\0\\2\end{array}\right], \left[\begin{array}{c}0\\2\\0\\-1\end{array}\right]}_{\text{Group 2}} \quad \underbrace{\left[\begin{array}{c}1\\0\\0\\2\end{array}\right], \left[\begin{array}{c}2\\0\\0\\-1\end{array}\right], \left[\begin{array}{c}0\\1\\2\\0\end{array}\right], \left[\begin{array}{c}0\\2\\-1\\0\end{array}\right]}_{\text{Group 3}}$$

FIG. 9

| UE Index | Group Index | Sequence Index | | | |
|---|---|---|---|---|---|
| | | 0 | 1 | 2 | 3 |
| ⋮ | ⋮ | ⋮ | ⋮ | ⋮ | ⋮ |
| UE-1, UE-2 | 1 | $S_{10}$ →UE-1→ $S_{11}$ | | →UE-2→ $S_{12}$ | $S_{13}$ |
| ⋮ | ⋮ | ⋮ | ⋮ | ⋮ | ⋮ |

$f(.)$ Increasing →

FIG. 10A

| UE Index | Group Index | Sequence Index | | | |
|---|---|---|---|---|---|
| | | 0 | 1 | 2 | 3 |
| ⋮ | ⋮ | ⋮ | ⋮ | ⋮ | ⋮ |
| UE-1, UE-2 | 1 | →UE-1→ →UE-2→ $S_{10}$ | $S_{11}$ | $S_{12}$ | $S_{13}$ |
| ⋮ | ⋮ | ⋮ | ⋮ | ⋮ | ⋮ |

$f(.)$ Increasing →

FIG. 10B

| Group Index | Sequence Index | |
|---|---|---|
| | 0 | 1 |
| 0 | s[k,1] | s[k,5] |
| 1 | s[k,7] | s[k,3] |
| 2 | s[k,2] | s[k,0] |
| 3 | s[k,6] | s[k,4] | f(.) Increasing →

FIG. 11

METHOD AND APPARATUS FOR NON-ORTHOGONAL MULTIPLE ACCESS COMMUNICATION

RELATED APPLICATION

This application claims the benefit of U.S. provisional application No. 62/776,221 filed Dec. 6, 2018, and is hereby incorporated by reference in its entirety.

FIELD

The present disclosure relates generally to wireless communication and, in particular embodiments, to methods and systems for non-orthogonal multiple access communication.

BACKGROUND

A number of transmitters may be associated with one receiver in a multiple access communication system. Some transmitters may simultaneously transmit different signals on the same radio resources, thereby resulting in a collision at the receiver. Simultaneously transmitting different signals on the same radio resources would enhance overall system capacity if the receiver manages to achieve a similar receiving performance with a collision as without the collision. System capacity enhancement is relevant on both downlink and reverse link (i.e., uplink including radio transmissions from a number of terminals to a base-station).

An outcome of the collision is largely related to the methods or topologies by which the multiple simultaneous transmitters transmit on the same resource. In wireless radio communication systems, the definition, specification, or mechanism of these methods or topologies is known as non-orthogonal multiple access (NoMA) technology.

To help a receiver resolve the collision, a NoMA technology seeks to minimize the resultant interference at the receiver. Although NoMA technology typically improves the spectrum efficiency of a communication system, the non-orthogonality inherent in the NoMA technology may also create challenges in terms of transmitter and receiver implementation. It is desirable to design a non-orthogonal multiple access transmission mechanism that simplifies or facilitates transmitter and receiver implementation.

SUMMARY

Technical advantages are generally achieved, by embodiments of this disclosure which describe methods and systems for non-orthogonal multiple access communication. Some embodiments of the present disclosure provide a flexible signaling capability between network side and UE side while catering many different use scenarios to meet multiple performance metrics/system parameters.

According to an aspect of the present disclosure there is provided a method that involves obtaining, by a transmitter, an indication of a group of spreading sequences, the spreading sequences in the group being from a pool of spreading sequences in which at least two spreading sequences in the pool are non-orthogonal, and each of the spreading sequences in the group are orthogonal to one another. The method further involves spreading, by the transmitter, a sequence of modulated symbols using a spreading sequence from the group of spreading sequences to generate a sequence of spread symbols; mapping, by the transmitter, the sequence of spread symbols to a set of resource elements, to generate a set of resource-mapped symbols; and transmitting, by the transmitter to a receiver, a non-orthogonal multiple access (NoMA) signal generated from the set of resource-mapped symbols.

According to some embodiments, spreading, by the transmitter, the sequence of modulated symbols using the spreading sequence corresponding to the obtained indication, to generate the sequence of spread symbols involves: spreading, by the transmitter, a first sequence of modulated symbols using a first spreading sequence of the group of spreading sequences corresponding to the obtained indication, to generate a first sequence of spread symbols; and spreading, by the transmitter, a second sequence of modulated symbols using a second spreading sequence of the group of spreading sequences corresponding to the obtained indication, to generate a second sequence of spread symbols.

According to some embodiments, the method further involves, prior to mapping the sequence of spread symbols to a set of resource elements, combining the first sequence of spread symbols and the second sequence of spread symbols.

According to some embodiments, in the group of spreading sequences, the spreading sequences are ordered in a direction of increasing or decreasing value of a transmission metric associated with the respective spreading sequence.

According to some embodiments, the transmission metric is a performance metric that is at least one of: cubic metric (CM); peak to average power ratio (PAPR); reliability including block error rate (BLER); transmission block size (TBS); modulation and coding scheme (MCS); overloading capability; receiver capability; allocated bandwidth; maximum coupling loss (MCL) range; and number of active user equipments (UEs).

According to some embodiments, the group of spreading sequences and respective spreading sequences in the groups are each identified by a respective index value.

According to some embodiments, the method further involves, receiving, by the transmitter, a starting index for the first spreading sequence; and at least one of: a direction of increasing index or decreasing index to identify the second spreading sequence; and a hopping pattern of spreading sequence indices.

According to some embodiments, the indication further includes an indication of at least one of: a type of spreading sequence to be used by the transmitter; a number of spreading sequences per group; a number of groups of spreading sequences; a performance metric; and a user equipment identifier.

According to some embodiments, obtaining the indication comprises selecting, by the transmitter, a spreading sequence or a group of spreading sequences from the pool of spreading sequences.

According to some embodiments, selecting the spreading sequence is based on at least one of: a network access device receiving type and/or capability; traffic load; traffic characteristics; signal to interference and noise ratio; interference to noise ratio; and signal to interference ratio.

According to some embodiments, the first spreading sequence and the second spreading sequence have at least one of the following characteristics: are both associated with a same spreading factor; are associated with different spreading factors; are both associated with a same sparsity ratio; and are both associated with different sparsity ratios.

According to some embodiments, each spreading sequence in the pool of spreading sequences has a corresponding association with a user equipment identifier (UE id) and obtaining the indication of a spreading sequence from a pool of spreading sequences comprises selecting the spreading sequence based the UE id.

According to some embodiments, the group of spreading sequences is grouped based on a type of spreading sequence, wherein the type of spreading sequence is at least one of: a spreading sequence having only one non-zero element; a spreading sequence having at least two non-zero elements and at least one zero element; or a spreading sequence having no zero elements.

According to some embodiments, the method further involves, generating a pool of discrete Fourier transform (DFT) spreading sequences using a fast Fourier transform (FFT) algorithm, the pool of spreading sequences including at least one group and each group including at least one spreading sequence; wherein the generating further comprises grouping spreading sequences based on at least one of: characteristics of the spreading sequences; and based on spreading sequences in the at least one group are non-orthogonal with respect to at least one other spreading sequence in the pool, and each of the spreading sequences in the at least one group are orthogonal to one another.

According to an aspect of the present disclosure there is provided an apparatus including a processor and a non-transitory computer readable storage medium. The non-transitory computer readable storage medium stores programming for execution by the processor, the programming including instructions to: obtain, by the apparatus, an indication of a group of spreading sequence, the spreading sequences in the group being from a pool of spreading sequences in which at least two spreading sequences in the pool are non-orthogonal, and each of the spreading sequences in the group are orthogonal to one another; spread, by the apparatus, a sequence of modulated symbols using the spreading sequence from the group of spreading sequences to generate a sequence of spread symbols; map, by the apparatus, the sequence of spread symbols to a set of resource elements, to generate a set of resource-mapped symbols; and transmit, by the apparatus to a receiver, a non-orthogonal multiple access (NoMA) signal generated from the set of resource-mapped symbols.

According to some embodiments, the programming including instructions to spread, by the apparatus, the sequence of modulated symbols using the spreading sequence corresponding to the obtained indication, to generate the sequence of spread symbols comprises programming including instructions to: spread, by the apparatus, a first sequence of modulated symbols using a first spreading sequence of the group of spreading sequences corresponding to the obtained indication, to generate a first sequence of spread symbols; and spread, by the apparatus, a second sequence of modulated symbols using a second spreading sequence of the group of spreading sequences corresponding to the obtained indication, to generate a second sequence of spread symbols.

According to some embodiments, programming includes instructions to combine the first sequence of spread symbols and the second sequence of spread symbols prior to mapping the sequence of spread symbols to a set of resource elements.

According to some embodiments, in the group of spreading sequences, the spreading sequences are ordered in a direction of increasing or decreasing value of a transmission metric associated with the respective spreading sequence.

According to some embodiments the transmission metric is a performance metric that is at least one of: cubic metric (CM); peak to average power ratio (PAPR); reliability including block error rate (BLER); transmission block size (TBS); modulation and coding scheme (MCS); overloading capability; receiver capability; allocated bandwidth; maximum coupling loss (MCL) range; and number of active user equipments (UEs).

According to some embodiments the group of spreading sequences is grouped based on a type of spreading sequence, wherein the type of spreading sequence is at least one of: a spreading sequence having only one non-zero element; a spreading sequence having at least two non-zero elements and at least one zero element; or a spreading sequence having no zero elements.

BRIEF DESCRIPTION OF THE DRAWINGS

For a more complete understanding of the present disclosure, and the advantages thereof, reference is now made to the following description taken in conjunction with the accompanying drawings, in which:

FIG. 8 is a particular example of a tabular form of a pool of spreading sequences according to an embodiment of the present application;

FIG. 9 is an example of a pool of spreading sequences arranged into three groups according to an embodiment of the present application;

FIG. 10A is another example of a tabular form of a pool of spreading sequences according to an embodiment of the present application;

FIG. 10B is a further example of a tabular form of a pool of spreading sequences according to an embodiment of the present application;

FIG. 11 is an example of a tabular form of a pool of spreading sequences arranged in pairs of spreading sequences according to an embodiment of the present application;

DETAILED DESCRIPTION

Figure 1:
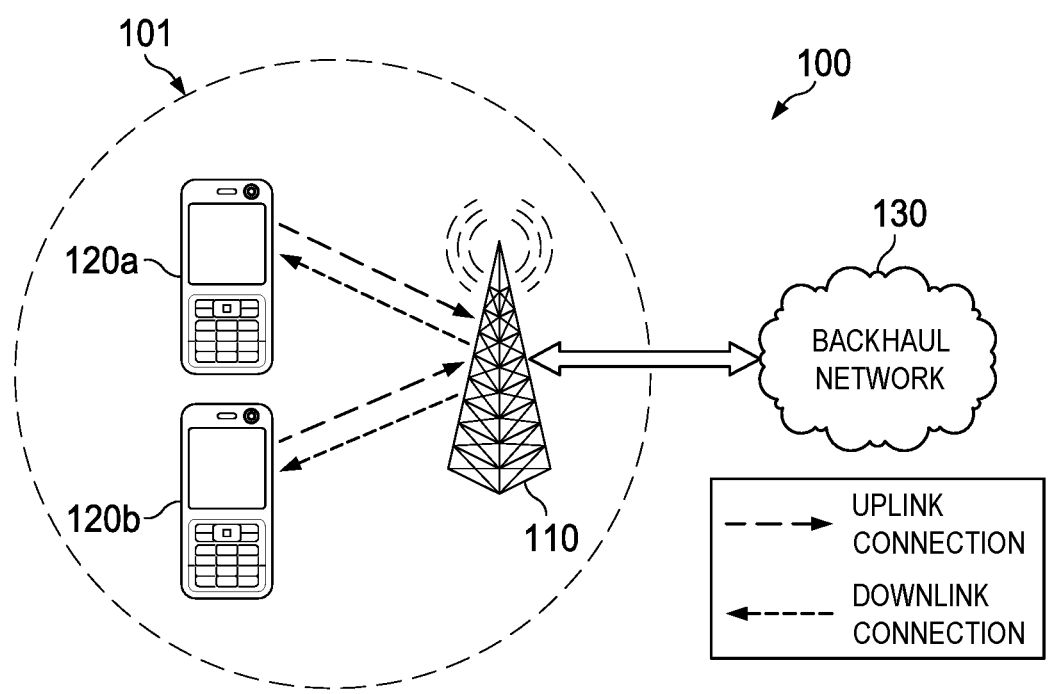
FIG. 1 is a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In a conventional orthogonal multiple access scheme, signals carried on different communication links use different physical resource elements (REs, e.g., time, frequency, code, etc.) independently and orthogonally, where the different communication links are between different mobile devices and a base station. While relatively simple and implementation-efficient, orthogonal multiple access schemes suffer from relatively poorer spectrum efficiency. Implementation-friendly non-orthogonal multiple (NoMA) access methods are desired to improve the spectrum efficiency of wireless communication systems.

Advanced NoMA schemes are typically implemented using non-standard, NoMA-specific hardware, such as a NoMA-specific modulator and/or a NoMA-specific symbol-to-RE mapper. However, the hardware implementation of non-standard, NoMA-specific hardware is significantly more complex than a conventional hardware implementation of a conventional multiple access scheme.

Due to this increased complexity and expense, NoMA may be unsuitable for practical implementation in conventional wireless communications networks. For example, wireless telecommunication standards have historically mandated the use of standard modulators $$\left(\text{e.g., } BPSK, \frac{\pi}{2}\text{-}BPSK, QPSK, 16\text{-}QAM, 64\text{-}QAM, 256\text{-}QAM, \text{etc.}\right)$$

and have been reluctant to adopt advanced NoMA implementations. The wireless telecommunication standards have been wary of the associated complexity and expense of NoMA, despite NoMA's considerable theoretical performance benefits, such as improved spectral efficiency, reduced overhead, more flexible resource allocation, and improved interference mitigation.

Accordingly, embodiments of the present disclosure describe hardware-friendly examples of advanced NoMA implementations. These hardware-friendly NoMA implementations may be easily and readily used in next-generation wireless communications networks and transceiver chips, which can take advantage of the performance benefits of said NoMA implementations with little or no undesirable impact on hardware complexity.

Aspects of the present disclosure are directed to linear spreading, in which the modulated symbol is multiplied by a sequence, the so-called linear spreading sequence. A linear spreading sequence may be associated with a multiple access (MA) signature or, in certain cases, may be substantially the same as an MA signature. An MA signature can be any information that may be used to distinguish different data transmissions that are sent over a shared physical channel. In a wireless communication system, for example, the MA signature facilitates multi-user and/or multi-branch communications.

A linear spreading sequence can define an entire MA signature or a portion of the MA signature. Spreading sequences can have different characteristics such as being sparse and non-sparse. The correlation properties among spreading sequences can vary significantly due to the way the sequences are constructed. The correlation properties determine the ability to separate the UEs/streams at the receiver side. In addition, the power amplifier efficiency measured by metrics such as peak to average power/cubic metric (PAPR/CM) and other properties of sequences can vary significantly due to the way the sequences are constructed. Also, multi-branch, multi-layer, or multi-stream transmission by a single UE may be supported to improve the spectral efficiency performance by enabling mechanisms for selection/assignment of multiple sequences to a single UE. Moreover, based on the spreading sequence construction and the inherited properties, some sequences are suitable for high overloading scenarios, while other sequences are suitable for high transmission block size (TBS) transmission. In another example, some sequences are more suitable for low complexity receiver architectures. Some sequences may show better PAPR/CM performance making them more suitable for cell-edge UEs. Some sequences only require low storage memory, which is beneficial for low complexity transmitter architectures such as user terminals/UEs. As such, multiple designs are suitable for different usage/application scenarios based on the target/desired performance metric. Unfortunately, there is no single sequence construction that exhibits all of these properties suitable for diverse usage scenarios. As a result, the choice of sequence and their assignment or selection dictate the overall system/network performance such as block error rate (BLER)/throughput/spectral efficiency (SE)/overloading capability and the aptness in terms of PAPR/CM, complexity (memory/computational)/coverage/maximum coupling loss (MCL), etc. On the other hand, to benefit from multitude of properties of the sequence, an appropriate sequence design as well as assignment/selection is desired. Furthermore, it is desirable to be able to easily implement the sequence design and assignment/selection method in state of the art hardware/systems.

A NoMA transmission can be grant-free (GF), also known as configured grant, or grant-based (GB). In a grant-based transmission, transmission control parameters are typically communicated via a Physical Uplink Control Channel (PUCCH) and/or Physical Downlink Control Channel (PDCCH). The base station is aware of the identity of a UE sending an uplink transmission using a granted uplink resources, because the base station specifically granted those uplink resources to that UE. In a configured grant/grant-free transmission, different UEs may send uplink transmissions using uplink resources shared by the UEs, without specifically requesting use of the resources and without specifically being granted the resources by the base station. One advantage of configured grant transmission is low latency resulting from not having to request and receive a grant for an allocated time and/or frequency resource from the base station. Furthermore, in a configured grant transmission, the scheduling overhead may be reduced. However, the base station does not have information which UE, if any, is sending a configured grant uplink transmission at a particular moment of time, which may require blind detection of configured grant transmissions received at the base station. In other words, the base station is required to determine which UE is transmitting. Therefore, the base station can use the combination of uplink reference symbols (RS) and occupied time-frequency resources to identify a UE as well as the transport block being received from that UE.

The fundamental approach of the MA signature or spreading sequence usage and the assignment of the MA signature or spreading sequence by the base station or selection of the MA signature or spreading sequence by the UE are different depending on whether the transmission is grant-based or grant-free. Generally, in grant-free transmission, the MA signature or spreading sequence is selected or chosen by the UE rather than explicitly assigned by the base station or network controller. In grant-based transmission, MA signatures are assigned by the base station or network explicitly or implicitly. MA signature or spreading sequence configuration can be performed using signaling to the UE that also includes other NoMA parameters such as resource configuration, transmission block size (TBS), modulation and coding scheme (MCS), demodulation reference signal (DM-RS) configuration. In grant-free or grant-based transmission, the UE needs to select a single or multiple MA signature(s) or spreading sequence(s) or the base station needs to assign a single or multiple MA signature(s) or spreading sequence(s) to the UE.

FIG. 1 is a diagram of a network 100 for communicating data. The network 100 comprises a base station 110 having a coverage area 101, a plurality of user equipments 120 (UEs) (e.g., UE 120a and UE 120b), and a backhaul network 130. As shown, the base station 110 establishes uplink (dashed line) and/or downlink (dotted line) connections with the UEs 120, which serve to carry data from the UEs 120 to the base station 110 and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as a "Node B," an enhanced Node B (eNB), a next generation Node B (gNB), a transmit/receive point (TRP), a macro-cell, a femtocell, a W-Fi access point (AP), and other wirelessly enabled devices. Base stations may provide wireless access in accordance with one or more wireless communication protocols, e.g., 5th generation "New Radio" (NR), Long Term Evolution (LTE), LTE Advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

Figure 2:
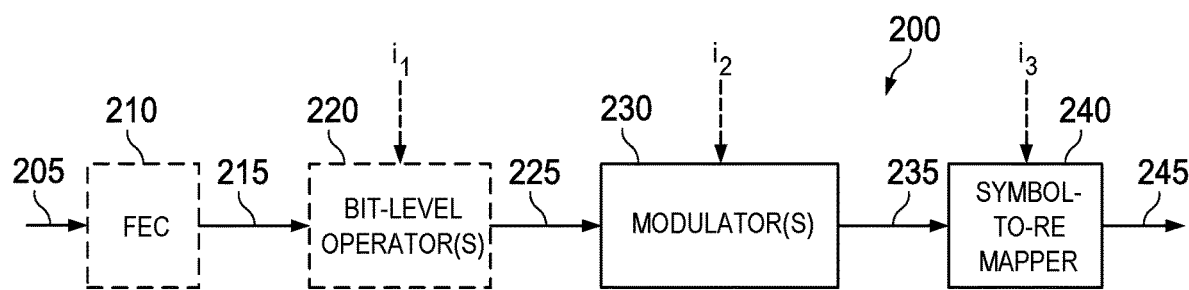
FIG. 2 is a diagram of an embodiment transmitter for transmitting a signal in the wireless communications network.

FIG. 2 is a diagram of an embodiment transmitter 200 for generating a multiple access signal 245 from input data 205. Input data 205 may be payload data encoded in a binary form. The payload may be "user" data that is destined for a UE 120, in a downlink transmission for example, or that is transmitted from the UE 120 to a base station 110, in an uplink transmission for example. Input data 205 may optionally be received at a forward error correction (FEC) encoder 210.

The FEC encoder 210 may be any encoder configured to produce an error-detection/correction encoded bit stream, including (but not limited to) a Turbo encoder, a low-density parity-check (LDPC) encoder, and/or a polar encoder. An error detection/correction encoded bit stream may be a bit-stream that includes error correction bits (e.g., parity bits, FEC bits, etc.) and/or error detection bits (e.g., cyclic redundancy check (CRC) bits, etc.). The FEC encoder 210 may apply error detection/correction encoding to an input data that was not previously encoded with error detection/correction. Alternatively, the FEC encoder 210 may apply error detection/correction encoding to an input data that already has some form of error detection/correction that is typically provided by an upper-layer function of whichever system implements the transmitter 200. The FEC encoder 210 generates a first bit-stream 215 and optionally forwards the first bit-stream 215 to one or more bit-level operators 220. Alternatively, the input data 205 is the first bit-stream 215, and is received directly at the bit-level operator(s) 220.

The bit-level operator 220 may be, for example, circuitry or software configured to execute a combination of bit-level operations (e.g., Boolean functions) in order to accomplish various functions such as bit interleaving, bit scrambling, full or partial bit-stream repetition, etc. Optionally, the function may be defined by one or more input parameters. Thus, the bit-level operator 220 may further receive one or more control signals $i_1$ for adjusting the one or more parameters of the bit-level operator 220. The bit-level operator 220 generates a second bit-stream 225 and forwards the second bit-stream to one or more modulators 230. Alternatively, the second bit-stream 225 may be the same as the input data or the first bit stream, in which case the modulator(s) 230 may directly receive the input data or the first bit stream.

The modulator 230 generates one or more symbols 235 from the second bit-stream 225. Typically, a symbol can be represented by one of many different complex-valued numbers, which each in turn represents a different binary number. In this way, the modulation function encodes one or more bits into a symbol. In other words, the modulator 230 includes a one-to-one mapping of unique bit sequences to unique symbols. The modulator 230 may also be known as bits-to-symbols mapping function or a modulated symbol sequence generator.

Examples of common modulators include Quadrature Amplitude Modulation (QAM), Binary Phase Shift Keying (BPSK), $$\frac{\pi}{2}\text{-}BPSK \text{ modulation,}$$

and Quadrature Phase Shift Keying (QPSK). QAM may be further sub-categorized by the "level" of modulation, i.e., by the length of the input bit sequence and the resulting number of possible different output symbols, such as 16-QAM, 64-QAM, and 256-QAM, for example. Additionally, QPSK may also be known as 4-QAM. The bit sequence-to-symbol mapping of a given modulator may be visually represented by a constellation diagram.

The above-listed modulators are examples of one-dimensional modulation where the mapping function is a one-to-one mapping of bits to a symbol. Alternatively, the modulator 230 may be an example multi-dimensional modulator. A multi-dimensional modulator is defined by a one-to-one mapping function, which maps a set of bits to multiple symbols.

Figure 3:
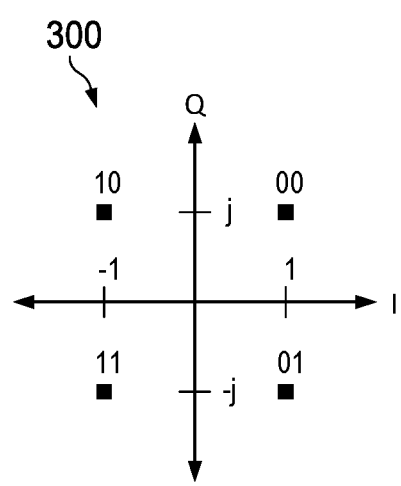
FIG. 3 is a constellation diagram of an example Quadrature-Phase Shift Keying (QPSK) modulator.

FIG. 3 is a constellation diagram 300 of a QPSK (or 4-QAM) modulator. The x-axis (real values) represents an in-phase component of a signal while the y-axis (imaginary values) represents a quadrature component of the signal. The constellation diagram shows four different symbols, at (1, j), (−1, j), (−1, −j), and (1, −j). Alternatively, the QPSK constellations can be given by $$\frac{1}{\sqrt{2}}(1+j), \frac{1}{\sqrt{2}}(-1+j), \frac{1}{\sqrt{2}}(-1-j), \frac{1}{\sqrt{2}}(1-j)$$

where symbol power is normalized to 1. Each of the four symbols is mapped to respective input bit sequences (00), (10), (11), and (01). The distance of the symbol point from the origin of the constellation represents the amplitude of the signal waveform; the angle of the symbol point relative a reference represents a phase difference of the signal waveform. Thus, the QPSK-modulated signal comprises symbols with the same amplitude and different phase changes. Other modulation schemes may comprise different symbol points on the constellation, resulting in different amplitudes and phase changes.

Returning to FIG. 2, the transmitter 200 may also additionally, or alternatively, implement more complex modulation schemes, such as multi-dimensional modulation.

Moreover, the transmitter 200 may implement multiple modulators 230, for example, to modulate parallel bit-streams, such as duplicate bit-streams or interleaved bit-streams.

The transmitter may optionally include a symbol spreading function, either as part of the modulator 230 or as a separate logical block. The symbol spreading function applies a spreading sequence, such as the aforementioned linear spreading sequence, to the modulated symbols by multiplying a sequence of the same repeated symbols with a sequence of complex values. This produces a sequence of different symbols that are inter-related by the spreading sequence.

The transmitter may optionally include a symbol scrambling function, either as part of the modulator 230 or as a separate logical block. The symbol scrambling function applies a scrambling sequence to the modulated symbols by multiplying a sequence of symbols with a sequence of complex values. This produces a new sequence of symbols different from the original sequence of symbols.

Optionally, the modulation mapping function may be defined by one or more input parameters. The modulator 230 may further receive one or more control signals $i_2$ for adjusting the one or more parameters of the modulator 230. For example, in case of linear spreading, the one or more control signals $i_2$ can determine the spreading sequence used to generate the output symbol sequence.

The transmitter 200 further comprises a symbol-to-resource element (RE) mapper 240, which receives the modulated symbols 235 from the modulator 230. The symbol-to-RE mapper 240 maps the sequence of symbols to a corresponding set of REs according to a given multiple access mapping rule, which results in the multiple access signal 245. The multiple access signal 245 may be further processed in the transmitter 200 before being ultimately transmitted to a receiver. For example, the multiple access signal 245 may be subject to OFDM or any other waveform modulator and then converted to an analog waveform and propagated over the air.

Optionally, the multiple access mapping rule may be defined by one or more input parameters. The symbol-to-RE mapper 240 may further receive one or more control signals $i_3$ for adjusting the one or more parameters of the symbol-to-RE mapper 240.

Figure 4:
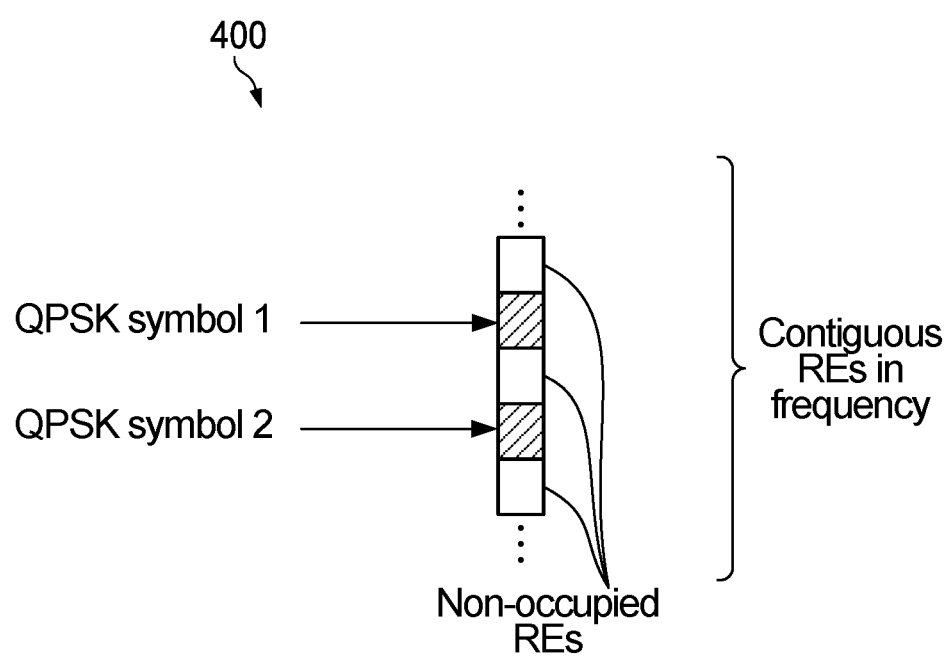
FIG. 4 is a schematic diagram of an example symbol-to-resource element (RE) mapping operation.

FIG. 4 is a schematic diagram showing an example operation 400, by the symbol-to-RE mapper 240, of mapping two QPSK symbols to specific REs. The location of the mapped REs among the set of all available REs may be specified by the one or more control signals $i_3$. The control signal may also specify which set of generated symbols are mapped to the REs. While FIG. 4 shows RE mapping in the frequency domain, the symbol-to-RE mapper 240 may also map the symbols to different REs in the time domain, as well as the frequency domain. While FIG. 4 indicates the REs are contiguous in the frequency domain, the REs may also be contiguous in the time domain.

Returning to FIG. 2, the combination of the input parameters of the bit-level operator 220, the modulator 230, and the symbol-to-RE mapper 240, and potentially other parameters, is referred to herein as a "multiple access (MA) signature". The MA signature may be identified by, or define, one or more of the control signals $i_1$, $i_2$, $i_3$, etc. Configuring one or more of the bit-level operator 220, the modulator 230, and the symbol-to-RE mapper 240 with the control signal(s) serves to apply the MA signature to input data 205 for generating the multiple access signal 245, which can then be transmitted in the multiple access communication system, and decoded by a receiver in the multiple access communication system.

The MA signature allows the multiple access communication system to support multi-user communications and/or multi-stream/multi-branch communications. Multi-user communications refers to communications that are specific to a user device or group of user devices. Multi-user communications may use the MA signature to reduce or manage interferences caused by simultaneous transmissions of different messages over the same shared physical resources (of time and frequency). If these interferences can be adequately reduced or managed, the multi-user communications may help improve the overall system capacity of a communications system.

Multi-stream/multi-branch communications refers to communications that are specific to a data stream, which is a more general concept than multi-user communications. For example, different users can communicate using different data streams, or one user can increase its throughput by using multiple data streams. Multi-stream communications may also be known as multi-layer communications or multi-branch communications.

Multi-user communications may also include multi-user detection. The MA signature enables user-specific signal processing at each UE transmitter. The user-specific signal processing may impart a certain structure to the generated signals, which facilitates the multi-user detection at a receiver.

A single UE may use one or more-than-one MA signatures from a pool of MA signatures for its transmission. The use of multiple signatures for a single UE facilitates multi-stream, multi-branch or multi-layer transmission that achieves high spectral efficiency performance. A pool of spreading sequences may comprise a single pool containing multiple groups of sequences based on various characteristics of the sequences. Furthermore, each group may contain multiple sub-groups based on some other characteristic(s).

For example, UEs being served by, or connected to, a base station may desire to use MA signatures that have high efficiency in terms of power amplifier performance in both single and multi-branch transmission scenarios. Accordingly, these UEs may desire to use signatures that exhibit low PAPR or low CM properties, or both. Such use of low PAPR or low CM signatures may improve cell coverage area and also save UE battery power.

Embodiments of the present disclosure provide methods for managing and using MA signatures and/or spreading sequences in a way that facilities multi-branch NoMA transmissions and/or NoMA transmissions optimized for a given performance metric.

Figure 5A:
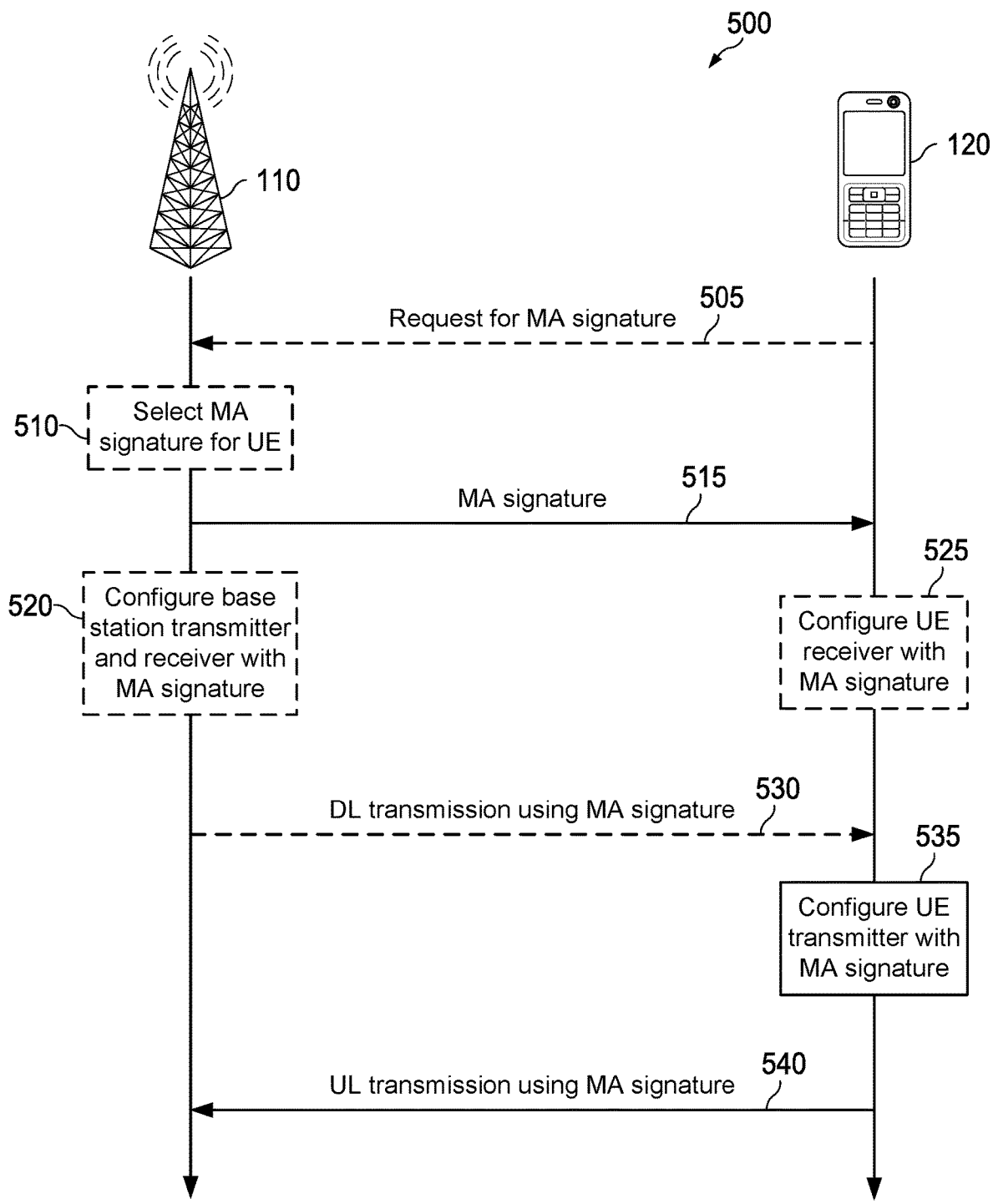
FIG. 5A is a flowchart diagram of a first example method for signaling and using a multiple access (MA) signature in the wireless communications network.

FIG. 5A is a signaling flowchart diagram showing an example method 500 for signaling the MA signature, and optionally using the MA signature, in a multiple access communication system. The method optionally comprises, at 505, a UE 120 sending to a base station 110 a request for an MA signature, and at 510, the base station 110, in response to the request, selecting the MA signature for the UE 120. The request for the MA signature may include any information for facilitating selection of the MA signature by the base station 110, including peak-to-average power ratio (PAPR) requirements, application type, transmission type/mode, transport block size (TBS), spectral efficiency (SE), modulation and coding scheme (MCS), receiver capability, transmitter capability, key performance indicator (KPI), FEC code rate, and modulation order. The UE 120 may indicate or report the information to the network explicitly or implicitly, for example, by making the selection linked to a UE identifier using a pre-configured mapping. Other explicit or implicit signaling possibilities also exist for communicating the information from the UE 120 to the network, or vice versa. These configurations, requests, parameters and/or information may or may not be directly related to the NoMA transmission.

The method 500 comprises, at 515, the base station 110 transmitting the MA signature (e.g., a spreading sequence) to the UE 120. Alternatively, the base station 120 may transmit the MA signature independently, without receiving a specific request. Further, the MA signature may be pre-defined for the UE 120 and the base station 110 may not need to select the MA signature. The MA signature may be transmitted using a layer 1 (L1)/physical layer signal or it may be transmitted using a higher-layer signal, such as Radio Resource Control (RRC) signaling. For example, the RRC signaling may indicate a chosen MA signature for the UE 120. Alternatively or additionally, the RRC signalling may indicate a pool of MA signatures (or spreading sequences) for the UE 120. Another approach for signalling information used by the UE to select the MA signal or to provide the UE with the MA signature to be used is MAC-CE (control-element).

Transmitting the MA signature (or spreading sequence) from the base station 110 to the UE 120 may include transmitting the MA signature itself or merely transmitting information that is indicative of the MA signature. For example, the base station 110 may transmit information that the UE 120 uses to derive its MA signature. For another example, the base station 110 may transmit an index corresponding to a specific MA signature, which the UE 120 uses in a lookup table to find the specific MA signature.

The base station 110 may also transmit other NoMA parameters in addition to the MA signature. Examples of NoMA parameters include: bit-level operation parameters; QAM modulation parameters; symbol-to-RE mapping parameters; resources over which to transmit the NoMA signal; transmit power levels; MCS parameters; receiver capability; traffic load; peak-to-average power ratio (PAPR) requirement; transmission type/mode; application type; TBS; KPI requirement, etc. One or more parameters may help determine the MA signature. Some parameters may be directly reported or indicated to the UE by the base station.

Some of the parameters may be indirectly obtained or derived. Some of the parameters may be chosen or selected by the UE based on measurements. The measurements may be performed by the UE at random or on demand or on request by the base station. UE choices and/or measurements may be reported back to the base station directly/explicitly or indirectly/implicitly. Alternatively, some or all of these NoMA parameters may be included in, or derived from, the MA signature.

In some cases, the UE 120 may derive the NoMA parameters from other information received from the base station 110, such as: information indicating an MCS level; TBS; spreading factor or related parameter; sparsity level/factor (which may be defined as the ratio of non-zero resources utilized for data transmission for a given device over the total available resources), or related parameter; Hybrid Automatic-Repeat-Request (HARQ) and associated parameters; grant-free or grant-based transmission and associated parameters; a number of UEs being served by the base station or related parameters such as the traffic load, which refers to the average number of users/streams simultaneously served by the base station (which is also referred to overloading factor).

A UE 120 may also select NoMA parameters based on a UE specific identifier, e.g., a radio node temporary identifier (RNTI). Alternatively, the UE 120 may select NoMA parameters based on a demodulation reference signal (DM-RS) pattern (or an index thereof) or based on a preamble signal (or an index thereof). A UE 120 may also randomly select NoMA parameters, e.g., a. NoMA signal is selected randomly based on information carrying bits, and the base station detects the NoMA signal based on an MA signature. Alternatively, a UE 120 may select NoMA parameters based on its own measurements. For example, the UE 120 may select NoMA parameters that provide the highest SINR, and avoid NoMA parameters that provide the lowest SINR. Alternatively, the NoMA parameters may be a priori information to the UE 120. As yet another alternative, the NoMA parameters may be selected according to a combination of the above-mentioned signaling/selection techniques (for example, a spreading sequence index associated with a spreading sequence may be explicitly signaled, while a scrambling index associated with a scrambling sequence may be derived from an MCS level).

The method 500 further optionally comprises, at 520, the base station 110 configuring transmitter(s) and receiver(s) of the base station 110 with the MA signature in order to transmit and receive multiple access communications with the UE 120. Optionally, at 525, the UE 120 similarly configures its receiver with the MA signature for receiving DL NoMA transmission from a base station. For example, at 525, the UE 120 configures its receiver using an MA signature received directly and explicitly from a base station 110.

Alternatively, the UE 120 configures its receiver using an obtained MA signature that is indirectly indicated by a base station 110. For example, the UE 120 may receive a particular DM-RS pattern that is pre-associated with an MA signature and use the received DM-RS to obtain the MA signature for configuring its receiver. For another example, the UE 120 may receive a particular preamble signal that is pre-associated with an MA signature and use the received preamble signal to obtain the MA signature for configuring its receiver. For yet another example, the UE 120 may receive a particular UE identifier that is pre-associated with an MA signature and use the received UE identifier to obtain the MA signature for configuring its receiver. Optionally, at 530, the base station 110 transmits, to the UE 120, a downlink transmission using the MA signature.

The base station 110 may configure its transmitter(s) and receiver(s) based on indications received from other UEs being served by the base station 110, indications received from UEs being served by neighboring base stations, measurements taken by the base station 110 (e.g., measurements derived from uplink pilots, reference signals, data, etc.), information received from other neighboring base stations (e.g., measurements, scheduling information, NoMA parameters assigned/used by neighboring base stations, etc.), and/or downlink information transmitted to the UEs. The NoMA parameters may include MA signatures, NoMA signal generation constraints (e.g., scrambling/spreading bit-level operations parameters), as well as NoMA related measurements that are to be taken and fed back to the base station 110. The NoMA parameters may be communicated via Radio Resource Control (RRC) signaling, downlink control information (DCI) messages, and/or media access control (MAC) control element (MAC-CE) signaling.

The method 500 comprises, at 535, the UE 120 configuring its transmitter with the MA signature and, at 540, transmitting, to the base station 110, an uplink transmission using the MA signature. Configuring the transmitter and transmitting with the MA signature allows the UE's transmissions to reduce interference with other UE's transmissions, and allows the base station 110 to decode the UE's transmission using the MA signature. The UE 120 may configure its transmitter using an MA signature received directly and explicitly from a base station 110.

Alternatively, the UE 120 configures its transmitter using an obtained MA signature that is indirectly indicated by a base station 110. For example, the UE 120 may receive a particular demodulation reference signal (DM-RS) pattern that is pre-associated with an MA signature and use the received DM-RS to obtain the MA signature for configuring its transmitter. For another example, the UE 120 may receive a particular preamble signal that is pre-associated with an MA signature and use the received preamble signal to obtain the MA signature for configuring its transmitter. For yet another example, the UE 120 may receive a particular UE identifier that is pre-associated with an MA signature and use the received UE identifier to obtain the MA signature for configuring its transmitter.

It should be appreciated that the NoMA parameters may also be selected by the UE 120 in other examples. For instance, a UE 120 may select NoMA parameters based on indications from the network. In some examples, some NoMA parameters are selected by the UE 120, while other NoMA parameters are selected by the base station 110. In some other embodiments, a UE identifier (UE id) can be used for NoMA parameter selection by UE 120. It should be appreciated that the NoMA parameters selected by the base station 110 and/or the UE 120 may be used to transmit uplink and/or downlink NoMA signals. When the NoMA parameters are used for uplink transmissions, the base station 110 may send a signal that specifies NoMA parameters selected by the base station 110 and/or information to be used for selection of NoMA parameters by the UE 120, and the UE 120 may use the indicated NoMA parameters to transmit uplink NoMA signals. When the NoMA parameters are used for downlink transmissions, the base station 110 may send a signal that specifies NoMA parameters selected by the base station 110 and/or information to be used for identification of NoMA parameters by the UE 120, and the UE 120 may use the indicated NoMA parameters for decoding of one or more downlink NoMA signals using single-/multi-stream or single-/multi-branch decoding/detection techniques.

In some embodiments, the UE 120 may send NoMA-related feedback to the base station 110. The feedback information may indicate that the UE 120 used a different NoMA parameter (e.g., a different index) than that which was signaled by the base station 110, such as when the UE 120 selects the NoMA parameters based on its own measurements. The feedback information may also indicate measurement taken by the UE 120, such as an average, minimum, or maximum SINR for a selected set of NoMA reference signals. The measurements may be reported periodically. Alternatively, the measurements may be reported on-demand based on instructions received from the base station 110, according to a NoMA transmission (mode) initialization, when a NoMA transmission is configured, or when a UE 120 performs an initialization/power-up procedure. The UE 120 may explicitly signal the index of the MA signature used or the offset of the MA signature index received from base station side signaling. A base station 110 can obtain information to derive a NoMA signal being used from other information reported by UEs of the same base station and/or neighbor base stations or UEs of the neighboring base stations.

A UE 120 may report to the base station 110 an SINR in the absence of NoMA transmission, which may be used by the base station 110 at the network side for deriving the NoMA parameters. The SINR report may indicate a best/worst/highest 'n' number or lowest 'm' number of SINR measurements corresponding to the NoMA signal, as well as an MCS level and desired NoMA signal parameters. Measurements/signaling from neighbor base station/UEs may be used for inter-cell and intra-cell interference mitigation. Cell-edge UEs of neighbor base stations may report the measurements (e.g., SINR) that can be used by the serving base station to avoid severe interference caused by its own cell-edge UEs to the cell-edge UEs of the neighboring cell.

Figure 5B:
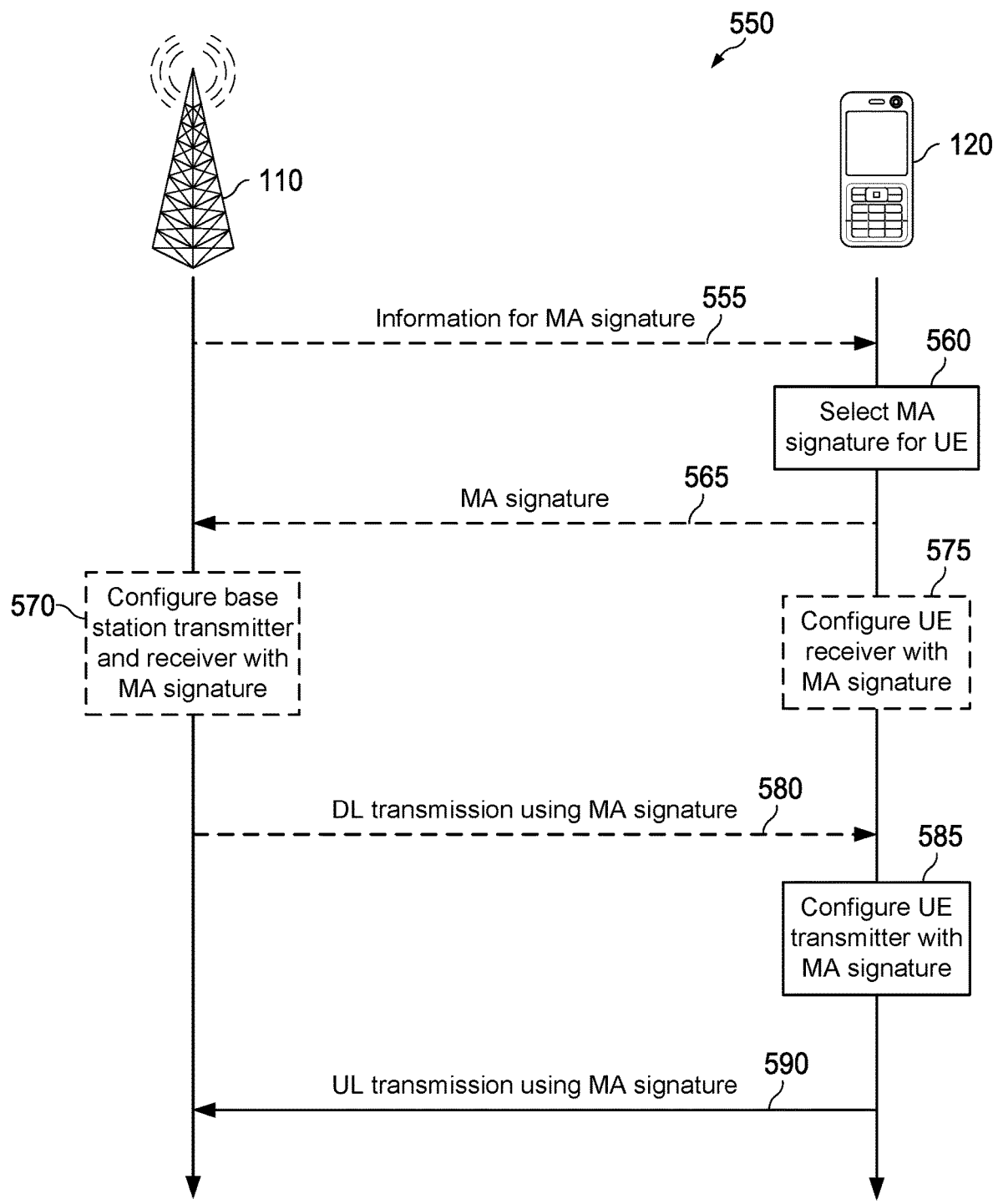
FIG. 5B is a flowchart diagram of a second example method for signaling and using an MA signature in the wireless communications network

FIG. 5B is a signaling flowchart diagram showing an example method 550 for the UE selecting the MA signature, and optionally using the MA signature, in a multiple access communication system. The method optionally comprises, at 555, the UE 120 receiving from a base station 110 information that may aid in the UE 120 selecting the MA signature. The base station 110 may also transmit NoMA parameters as part of the information. Examples of NoMA parameters include: bit-level operation parameters; QAM modulation parameters; symbol-to-RE mapping parameters; resources over which to transmit the NoMA signal; transmit power levels; MCS parameters; receiver capability; traffic load; peak-to-average power ratio (PAPR) requirement; transmission type/mode; application type; TBS; KPI requirement, etc. One or more parameters may help determine the MA signature. Some parameters may be directly reported or indicated to the UE by the base station. Some of the parameters may be indirectly obtained or derived. Some of the parameters may be chosen or selected by the UE based on measurements. The measurements may be performed by the UE at random or on demand or on request from the base station.

At 560, the UE 120 selects the MA signature for the UE 120. In some embodiments, the UE may select the MA signature at random or based on an implicit indication received from the base station 110 in 555. In a particular example, a UE ID may be mapped to the MA signature. This may be a result of a factory configuration as opposed to dynamic signalling. These configurations, requests, parameters and/or information may or may not be directly related to the NoMA transmission.

At 565, the UE may optionally send to the base station 110 the MA signature that the UE 120 has selected. Transmitting the MA signature (or spreading sequence) from the UE 120 to the base station 110 may include transmitting the MA signature itself or merely transmitting information that is indicative of the MA signature, such as an index from a table listing all the spreading sequences that is known to both the base station 120 and the UE 110. For example, the UE 120 may transmit information that the base station 110 uses to derive its MA signature (for example, transmitting a reference signal such as a demodulation reference signal (DM-RS) associated with an MA signature that the base station may implicitly derive). For another example, the UE 120 may transmit an index corresponding to a specific MA signature, which the base station 110 uses in a lookup table to find the specific MA signature.

In some cases, the UE 120 may derive the NoMA parameters from other information received from the base station 110, such as: information indicating an MCS level; TBS; spreading factor or related parameter; sparsity level/factor (which may be defined as the ratio of non-zero resources utilized for data transmission for a given device over the total available resources), or related parameter; Hybrid Automatic-Repeat-Request (HARQ) and associated parameters; grant-free or grant-based transmission and associated parameters; a number of UEs being served by the base station or related parameters such as the traffic load, which refers to the average number of users/streams simultaneously served by the base station (which is also referred to overloading factor).

A UE 120 may also select NoMA parameters based on a UE specific identifier, e.g., a radio node temporary identifier (RNTI). Alternatively, the UE 120 may select NoMA parameters based on a demodulation reference signal (DM-RS) pattern (or an index thereof) or based on a preamble signal (or an index thereof). A UE 120 may also randomly select NoMA parameters, e.g., a. NoMA signal is selected randomly, and the base station detects the NoMA signal based on an MA signature. Alternatively, a UE 120 may select NoMA parameters based on its own measurements. For example, the UE 120 may select NoMA parameters that provide the highest SINR, and avoid NoMA parameters that provide the lowest SINR. Alternatively, the NoMA parameters may be a priori information to the UE 120. As yet another alternative, the NoMA parameters may be selected according to a combination of the above-mentioned signaling/selection techniques, e.g., a spreading matrix/sequence index may be explicitly signaled and a scrambling index may be derived from an MCS level.

The method 550 further optionally comprises, at 570, the base station 110 configuring transmitter(s) and receiver(s) of the base station 110 with the MA signature in order to transmit and receive multiple access communications with the UE 120. Optionally, at 575, the UE 120 similarly configures its receiver with the MA signature for receiving DL NoMA transmission from a base station. For example, at 575, the UE 120 configures its receiver using a selected MA signature.

The base station 110 may configure its transmitter(s) and receiver(s) based on indications received from other UEs being served by the base station 110, indications received from UEs being served by neighboring base stations, measurements taken by the base station 110 (e.g., measurements derived from uplink pilots, reference signals, data, etc.), information received from other neighboring base stations (e.g., measurements, scheduling information, NoMA parameters assigned/used by neighboring base stations, etc.), and/or downlink information transmitted to the UEs. The NoMA parameters may include MA signatures, NoMA signal generation constraints (e.g., scrambling/spreading bit-level operations parameters), as well as NoMA related measurements that are to be taken and fed back to the base station 110. The NoMA parameters may be communicated via Radio Resource Control (RRC) signaling, downlink control information (DCI) messages, and/or media access control (MAC) control element (MAC-CE) signaling.

The method 500 comprises, at 585, the UE 120 configuring its transmitter with the MA signature and, at 590, transmitting, to the base station 110, an uplink transmission using the MA signature. Configuring the transmitter and transmitting with the MA signature allows the UE's transmissions to reduce interfering with other UE's transmissions, and allows the base station 110 to decode the UE's transmission using the MA signature. The UE 120 may configure its transmitter using a selected MA signature.

It should be appreciated that MA signatures may take different forms depending upon the multiple access scheme that is being implemented. "Spreading" is an example effect of an MA signature. In other words, the MA signature may comprise a definition for applying a spreading sequence to input data. Interleaving (of bits or symbols) is another example effect of an MA signature. A particular symbol-to-RE mapping pattern is yet another example effect of an MA signature.

In the present disclosure, spreading is defined to encompass operations that associate a value of at least one input bit in the transmission chain, with two or more symbols generated in the transmission chain. That is, the value of the one input bit becomes associated with two or more symbols transmitted over physical resources.

Spreading operations may be classified as linear or non-linear. Linear spreading may refer to an operation that creates a relationship between symbols in a sequence of symbols, where the relationship is independent of input bit values of the input bit-stream such that a change in the input values does not affect the relationship between the symbols. By way of example, an embodiment linear spreading technique may effectuate a phase difference between two symbols that remains consistent across all combinations of input bit-values. Spreading factor may refer to the ratio of a number of symbols in a symbol sequence that has been spread to a number of symbols prior to the spreading operation. For example, for a symbol $x_1$ carrying $m_1$ number of bits that is spread by sequence $[1, -1]$, a spreading factor is 2 and the spread symbol sequence is $[x_1, -x_1]$. In another example, for a symbol $x_2$ carrying $m_2$ number of bits, spread by sequence $[1, -1, j, -j]$, the spreading factor is 4 and the spread symbol sequence is $[x_2, -x_2, jx_2, -jx_2]$. Alternatively, other parameters may be defined. One can define a parameter of the ratio of a number of symbols prior to spreading to the number of spread symbol sequences, i.e., reciprocal of spreading factor. In yet another example, a parameter may be defined as a ratio of a number of bits of spread symbols to a number of bits prior to spreading. For example, $m_3$ number of bits are spread to produce a sequence of symbols, or a symbol carrying $n_3$ number of bits, where $n_3 > m_3$, and the ratio $m_3/n_3$ or $n_3/m_3$ can be defined as a parameter associated with spreading. The case of $m_3 = n_3$ is non-spreading scenario.

Non-linear spreading may refer to an operation that creates a relationship between symbols in a sequence of symbols, where the relationship depends on input bit values of the input bit stream such that different relationships between symbols are formed for different combinations of input bit-values.

Code division multiple access (CDMA) is an air interface design based on linear spreading used in 3G cellular systems. There are several NoMA schemes proposed for 3GPP new radio (NR) standardization that use linear spreading. However, a majority of the NoMA schemes use spreading sequences that are non-sparse spreading sequences (i.e., a spreading sequence with all non-zero elements). An alternative to a non-sparse spreading sequence is a sparse spreading sequence. Low density spreading (LDS) is such a sparse spreading sequence, which may also be referred to as a sparse signature, where each sequence has only a few non-zero components while other components are zeros. A non-zero component may refer to a modulated symbol or a modified modulated symbol. A ratio between a number of non-zero components to a number of total components (both zero and non-zero components) is commonly referred to as a sparsity ratio or sparse density. Other parameters such as the ratio between non-zero components to zero-components may be defined. Yet in another example, the non-zero or zero components for a fixed number of resources may be defined. In all proposed schemes, both sparse and non-sparse spreading sequences form, or in part form, the MA signatures to facilitate UE separation at the receiver side.

In the existing schemes for linear spreading, the MA signatures (i.e. the spreading sequences) are UE-specific. The existing schemes generally provide a mechanism to configure or assign one or more spread sequences to the UEs or the UEs select one or more spreading sequences from a pool of available spreading sequences. The association of the MA spread sequence to a UE is commonly viewed as one-to-one mapping of a UE specific identifier, such as radio network temporary identifier (RNTI), to the spreading sequence pool.

However, none of the existing methods are known to map the spreading sequences to other communication parameters that are related to NoMA transmission either directly (explicitly) or indirectly (implicitly). Examples of such NoMA transmission parameters may include PAPR requirements, coverage related parameters such as MCL (maximum coupling loss), transmission block size (TBS), spectral efficiency (SE), receiver type, receiver capability, operation/ allocated bandwidth, traffic load (short-term or long-term), number of UEs/layers/streams simultaneous transmitting, overloading, etc. Aspects of the present disclosure aim to address the above issue by categorizing the MA spreading sequences based on properties of the spreading sequences or NoMA transmission parameters, or both, and providing a connection or association between the key performance indicator (KPI) to the spreading sequence properties.

Figures 6, 7:
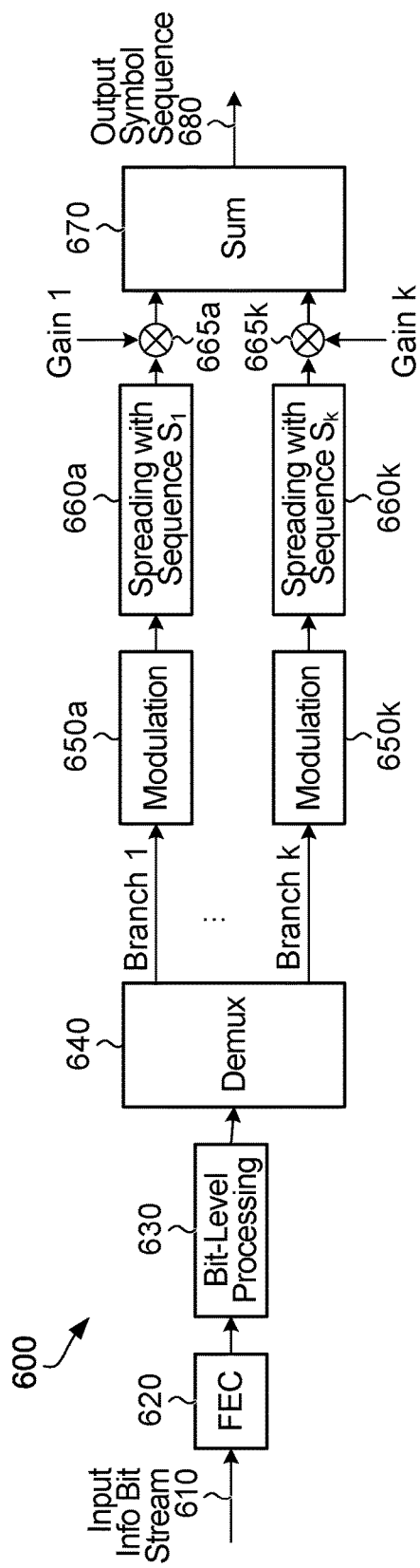
FIG. 6 is a schematic diagram of an example multi-branch Non-Orthogonal Multiple Access (NoMA) transmitter.
FIG. 7 is a general example of a tabular form of a pool of spreading sequences according to an embodiment of the present application.

A general block diagram of NoMA transmitter 600 based on linear spreading is shown in FIG. 6. An input bit stream 610 is provided to an FEC encoder 620. The FEC encoded signal output from the FEC encoder 620 is provided to the bit-level processing block 630. The output of the bit-level processing block 630 is provided to a demultiplexer 640. The demultiplexer 640 demultiplexes the signal into k branches, only branches 1 and k being shown in FIG. 6. In each branch, the demultiplexed signal is provided to a modulator 650 (650a . . . 650k). In some embodiments, the demultiplexer is before the bit-level processing block or even before the FEC encoder 620 implying that each branch has its own FEC encoder and/or bit-level processor. Also in each branch, the output of the modulator 650 is provided to a spreading sequence block (660a . . . 660k). The output of the spreading sequence blocks (660a . . . 660k) in each branch is provided to a respective multiplier (665a . . . 665k) to multiply the output of the spreading sequence block (660a . . . 660k) by a gain value (1 . . . k). The output of the multipliers (665a . . . 665k) in each branch are then summed by summing block 670 to produce output 680. The output is then mapped to physical resources with further processing as described earlier.

An example of modulation type used in the modulators 650 is legacy QAM modulation. FEC and bit-level processing can be common to all branches as shown in FIG. 6 or, all, or several of these blocks can be branch specific. The generated symbol sequence 680 at the output of the summing block 670 may be input to a symbol-to-RE mapping block with sparse or non-sparse mapping.

The transmitter 600 may optionally include one or more symbol scrambling functions, either as part of each spreading sequence block (660a . . . 660k) or as a separate logical block following the summing block 670. A length of the scrambling function may or may not be the same as a length of the spreading sequence. Furthermore, each branch may be associated with a same particular scrambling sequence, or different branches may be associated with different scrambling sequences.

An aspect of the present disclosure may provide a method for MA spreading sequence assignment by the base station or selection by the UE based on input parameters including SE, TBS, modulation and code rate/MCS, PAPR requirements, receiver capability, reliability, etc. Another aspect of the present disclosure may provide a method for signaling support for NoMA transmission using linear spreading. A further aspect of the present disclosure may provide a method for spreading sequence assignment or selection for multi-branch and low PAPR transmissions. Yet a further aspect of the present disclosure may provide a method for NoMA transmission based on linear spreading for GF and GB scenarios. Still another aspect of the present disclosure may provide a method for spreading pool generation and grouping. Still a further aspect of the present disclosure may provide a method for spreading sequence pool generation based on discrete Fourier transform (DFT) sequences.

According to some aspects of the disclosure, there is provided a method for a UE to select or be assigned or configured with a spreading sequence that is based on one or more communication parameters such as receiver type, receiver capability, SE, TBS, MCS, traffic load, PAPR requirement, MCL, number of layers, overloading, reliability requirement, transmission power consumption, number of active UEs, and transmission latency constraint, etc. In some embodiments, the spreading sequence may be related to a performance metric associated with an above parameter (PAPR, BLER, etc.). In some embodiments, this objective may be achieved by associating spreading sequences with parameters or performance metrics, or both. In some instances the spreading sequences may be arranged or ordered in a manner to reduce signaling overhead (e.g., signaling an index is more efficient than signaling a value of a metric, and ordering correlates the index to the value).

Conventional multi-branch transmission using randomly or improperly assigned sequences to each branch often result in poor performance. Some aspects of the disclosure provide methods for improving multi-branch performance. In some embodiments, methods for improving multi-branch performance involve grouping (optionally including hierarchically grouping) specially chosen spreading sequences together.

For example, a first group includes a different spreading sequence for each branch, where all of the sequences are orthogonal to each other. A second group includes different spreading sequences from the first group; in similar fashion, each branch is associated with a different spreading sequence and all of the spreading sequences are orthogonal to each other. Each group is uniquely identified, such as by a table index. Using indexing to signal a group, as opposed to signaling each spreading sequence individually, may reduce signaling overhead.

Alternatively, the spreading sequences in one or more groups may be minimally-correlated rather than orthogonal.

A multiple access spreading sequence pool may further group spreading sequences based on type. In some embodiments, the spreading sequence type can be defined based on characteristics of spreading sequences, for example, sparsity or sparse density/ratio. In some embodiments, the spreading sequence pool may be hierarchically grouped according to two or more groupings. For example, spreading sequences may be first grouped according to type, and secondly grouped according to sequence orthogonality or minimum-correlation. In this way, a transmitter may achieve improved multi-branch operation and also flexibly adapt to different NoMA modes of operation.

Described below are three example types of spreading sequences based on sparsity ratio. Of course, other groupings based on spreading sequence type are also possible.

Type 1—Ultra-Sparse Spreading Sequence

This corresponds to a spreading sequence with only one non-zero element in the spreading sequence having a spreading length equal to SF elements. Therefore, there are total of SF such sequences that can be defined. This SF number of sequences can form a group. For example, for SF=4 there are 4 different sparse sequences; [1 0 0 0], [0 1 0 0], [0 0 1 0], [0 0 0 1]. Such a group of sequences is useful for a low complexity implementation when a chip-wise minimum mean square error (MMSE) receiver is used with, or without, multi-branch operation. Values other than 1 can also be used in construction of ultra sparse sequences. In the above four ultra-sparse sequences/patterns, 1 and 0 indicate non-zero and zero elements respectively and may not indicate the actual value being mapped/transmitted in the physical resources.

Type 2—SPARSE Spreading Sequence

This corresponds to a spreading sequence with more than one non-zero element, but with at least one zero in the sequence. In other words, the spreading sequence of length SF has m number of non-zero elements and the rest of the elements (SF-m) are zeros. The sparse spreading sequences can be based on $$\binom{SF}{m}$$

sparsity patterns. For example, m=2 and SF=4 gives 6 sparsity patterns as follows $$\begin{bmatrix}1\\1\\0\\0\end{bmatrix}, \begin{bmatrix}0\\0\\1\\1\end{bmatrix}, \begin{bmatrix}1\\0\\1\\0\end{bmatrix}, \begin{bmatrix}1\\0\\0\\1\end{bmatrix}, \begin{bmatrix}1\\0\\0\\1\end{bmatrix}, \begin{bmatrix}0\\1\\1\\0\end{bmatrix} \text{ where } \binom{SF}{m}=6.$$

A few options of sequences can be short-listed based on the block error rate (BLER)/Throughput/spectral efficiency (SE) performance, PAPR etc. In above six sparse patterns, 1 and 0 indicate non-zero and zero elements respectively and may not indicate the actual value being mapped/transmitted in the physical resources.

A designed set of spreading sequences for the same sparsity pattern can be based on non-zero elements having a value other than of '1'. Such sequences may benefit the receiver for code domain separation. In a particular example, a set of 12 spreading sequences for SF=4, m=2 may be represented as:

$$\begin{bmatrix}1\\2\\0\\0\end{bmatrix}, \begin{bmatrix}2\\-1\\0\\0\end{bmatrix}, \begin{bmatrix}0\\0\\1\\2\end{bmatrix}, \begin{bmatrix}0\\0\\2\\-1\end{bmatrix}, \begin{bmatrix}1\\0\\2\\0\end{bmatrix}, \begin{bmatrix}2\\0\\-1\\0\end{bmatrix},$$

$$\begin{bmatrix}0\\1\\0\\2\end{bmatrix}, \begin{bmatrix}0\\2\\0\\-1\end{bmatrix}, \begin{bmatrix}1\\0\\0\\2\end{bmatrix}, \begin{bmatrix}2\\0\\0\\-1\end{bmatrix}, \begin{bmatrix}0\\1\\2\\0\end{bmatrix}, \begin{bmatrix}0\\2\\-1\\0\end{bmatrix}$$

In yet a further embodiment, a particular sequence grouping may be used by the transmitter to achieve a specific mode of operation. For example, the above group of 12 spreading sequences may be used by a transmitter to emulate a particular sparse code multiple access (SCMA) codebook. The transmitter may pair certain spreading sequences of the same sparsity pattern in the above list of 12 sequences and apply the paired sequences to symbols output from a 4-QAM modulator in each branch, in order to produce an output that is equivalent to a SCMA 16-point codebook.

For example, the use of $$\begin{bmatrix}1\\2\\0\\0\end{bmatrix}, \begin{bmatrix}2\\-1\\0\\0\end{bmatrix},$$

which are the first pair of spreading sequences, will produce a 16-point SCMA codebook. In other words, these sequences produce $[s_1\ s_2\ 0\ 0]^T$ where $s_1$ and $s_2$ are two symbols of the 16-point SCMA codebook.

In another example, sparsity can be introduced after the multi-branch operation. In other words, sparsity is not integrated into the spreading sequence itself. Therefore, sparsity may be applied individually to each branch or be common to all the branches, or a combination of the two, i.e. several branches share a common sparsity and for the remaining branches, the sparsity is applied individually.

Sparsity can be implemented in a multitude of ways. As shown above, sparsity is an integral part of the spreading sequence. In another example, multiplication by a diagonal matrix can produce sparsity. For example, an output of the spreading sequence is multiplied by a rectangular diagonal matrix with matching dimensions. In the above example, rectangular diagonal matrix $$\begin{bmatrix} 1 & 0 \\ 0 & 1 \\ 0 & 0 \\ 0 & 0 \end{bmatrix}$$

multiplied by spreading sequence $$\begin{bmatrix} 1 \\ 2 \end{bmatrix} \text{ and } \begin{bmatrix} 2 \\ -1 \end{bmatrix}$$

in two branches can produce the 16-point SCMA codebook with a sparse pattern. In another example, puncturing or pruning can produce the desired sparsity patterns. It should be noted that matrix/vector representation is only for notational convenience and implementation and representation can be different. For example, matrix multiplication may be expressed as element wise multiplication.

Type 3—Non-Sparse Spreading Sequence

This corresponds to a spreading sequence with all non-zero elements. In other words, all symbols in the spreading sequence of length SF sequence are non-zero.

These spreading sequences rely on sequence or code domain separation of transmissions from multiple UEs and do not use sparsity to separate the UEs. There are different ways of designing such non-sparse spreading sequences. Each design may produce a plurality of sequences for each value of spreading factor (SF), in which each of the plurality of sequences can be regarded as a spreading sequence pool. Some designs may result in a restricted pool size (for example, the given restricted alphabet $\{-1, 1, j, -j\}$ and SF=4, produces a maximum of 64 sequences). Some sequence designs can produce a configurable pool size. This type of sequence may be useful when single-branch operation and block-wise multi-user detection (MUD) such as block-minimum mean square error (MMSE) is used at the receiver side. A MUD MMSE receiver can operate block-wise in the spatial domain and the spreading domain.

From the spreading sequence types described above, the spreading sequence pool construction or generation can be performed as follows. The pool may consist of groups of multiple access (MA) spreading sequences of the same or different types. The pool consists of N number of groups indexed from $0, \ldots, N-1$ and each group has M number of spreading sequences for a total of NM number of spreading sequences. As mentioned above, the spreading sequence can define the entire MA signature or a portion of the MA signature. Consequently, the spreading sequence is associated with a MA signature, which helps the receiver to separate the multiple transmissions using a multi-user detector. The spreading sequence can also be used to separate multi-streams or multi-branches from the same UE.

In some embodiments, the spreading sequences within a same group are orthogonal, i.e., two spreading sequences $s_{ij}$ and $s_{ik}$, $j \neq k$ in group i is $s_{ij} \perp s_{ik}$, $j \neq k$, $s_{ij} \in \Psi_i$, $s_{ik} \in \Psi_i$ and $i=1, \ldots, N$. It means that $s_{ij}^H \cdot s_{ik}=0$. This forces a condition that $M \leq SF$.

In some embodiments, the spreading sequences of a group are sorted or ordered based on a performance metric. A non-limiting list of example performance metrics that can be used to arrange or sort the spreading sequences includes power amplifier efficiency in the form of cubic metric (CM) or peak-to-average power ratio (PAPR), sparsity ratio, block error rate (BLER) performance, and maximum coupling loss (MCL) range support. Therefore, any two sequences $s_{ij}$ and $s_{ik}$ in a group i, $f(s_{ij}) \leq f(s_{ik})$, $\forall j \leq k$, where $f(\cdot)$ represents a given metric, satisfy an ordering arrangement within a group for index k having a "larger" parameter value than index j. In some embodiments, the sequences can be arranged in non-increasing order of the defined metric, i.e. $f(s_{ij}) \geq f(s_{ik})$, $\forall j \leq k$.

FIG. 7 illustrates a tabular representation showing spreading sequences each having an associated index and arranged in groups with a respective associated group index. For example, $s_{11}$ represents a first spreading sequence in a first group, $s_{12}$ represent a second spreading sequence in the first group, and $s_{1M}$ represents an $M^{th}$ spreading sequence in the first group. Likewise, $s_{N1}$ represents a first spreading sequence in an $N^{th}$ group, $s_{N2}$ represent a second spreading sequence in the $N^{th}$ group, and $s_{NM}$ represents an $M^{th}$ spreading sequence in the $N^{th}$ group. In one example embodiment, the spreading sequences in the same row of the table, i.e. corresponding to a particular group, are orthogonal to one another.

Although FIG. 7 shows different spreading sequences arranged by an increasing/decreasing performance metric $f(\cdot)$, alternative arrangements may not require any increase or decrease in a given performance metric. For example, in the case of a multi-branch spreading sequence pool, all of the sequences may have the same correlation, or may be orthogonal (the correlation is zero, i.e., $s_{ij}^H \cdot s_{ik}=0$ for $j \neq k$). In such a case, the metric remains the same within a group. Because spreading sequences in each group are orthogonal, cross correlation between the spreading sequences in a respective group is equal to zero. The property of zero cross correlation among spreading sequences may be useful in multiple different scenarios. A particular example use case is multi-branch/multi-layer or multi-stream transmission from a single UE.

In another example, sequences can be ordered in increasing or decreasing manner. Sequence correlation or PAPR/CM or combination of such performance metrics can be used for sequence ordering. In some embodiments, all of the spreading sequences in the pool may be contained in a single table. In some embodiments, the single table may have sub-tables that have spreading sequences having different characteristics due to being associated with particular parameters or performance metrics. In some embodiments, the pool of spreading sequences may be divided into multiple tables according to particular parameters or performance metrics.

In some embodiments, the number of sequences in a group may not be the same as the number of sequences in another group. For example, group i may have $n_i$ number of sequences and group j and $j \neq i$ may have more or less than $n_i$ number of sequences. In some embodiments, sparse and non-sparse sequences may be in the same table or multiple tables, in case of tabular representation.

In some embodiments, the number of groups in the spreading sequence pool can depend upon a sequence type. For example, in the case of ultra-sparse spreading sequence type (described above as type 1), there may be only one group in the pool and each spreading sequence within the group is orthogonal to the other spreading sequences. In the case of other spreading sequence types (type 2 and type 3), the spreading sequences may be divided into multiple groups, where the spreading sequences within each of the groups are orthogonal to the other spreading sequences within the respective group. For example, for a scenario with a SF=4 and when the sequences are limited to a QPSK alphabet, i.e., $\{1, j, -1, -j\}$, and where $j=\sqrt{-1}$, a set of 64 linear spreading sequences can be arranged in 16 groups of size 4. An example set of 64 spreading sequences is shown in FIG. 8, in which there are four sequences per group and 16 groups. The number of spreading sequences is not intended to be limited to 4 per group or the number of groups limited to 16. The number of sequences per group and the number of groups is implementation specific and may be based on other factors as described herein.

The spreading sequences of a same group can be organized or arranged in an ascending order or a descending order with regard to a given performance metric. For example, with respect to the example table in FIG. 7, the four sequences of group index 1 are ordered in an increasing order of PAPR. Similarly, other groups may also be ordered according to PAPR. In other embodiments, performance metrics other than PAPR can be used, such as CM, correlation, combination thereof etc. Ordering of spreading sequences may result in grouping of the spreading sequences in multiple different ways. For example, the metric may fall within a certain range or with multiple thresholds, a lower and/or upper limit or threshold, etc.

In some embodiments, the number of spreading sequences in a group may be limited to a maximum size. For example, a system may have a specified limitation on a number of maximum branches/layers or streams per UE. When the performance metric is based on, for example, BLER or throughput, or limiting a number of reporting/signaling overhead, the spreading sequences per UE may be limited to a maximum size. Moreover, the limitation of the number of spreading sequences in a group may be related to other NoMA parameters such as the modulation order (BPSK, pi/2 BPSK, QPSK/4-QAM, 16-QAM, 256-QAM, 4-, 8-, 16-, 64-, 256-point SCMA/modified modulation), MCS, TBS, SE, FEC code rate, RB allocation, grant-free or grant-based, configured grant, receiver capability, overloading, sparsity ratio, number of UEs transmitting simultaneously, etc. For example, in certain scenarios two layers per UE are configured or permitted only for certain values of TBS. In another example, in certain scenarios two layers per UE are configured or permitted only for certain modulation order, FEC rates, SE range, resource block (RB) allocation, etc. In some embodiments, a relationship or association of a number of layers with respect to other parameters of the system may be explicitly mentioned. Alternatively, a preconfigured table of spreading sequences may follow a set of rules or a relationship or a particular association.

In a single table representative of the spreading sequence pool, the arrangement or ordering of spreading sequences in a group may rely on multiple performance metrics. For example, more than one group is enabled for a specific use scenario. Sequences can be optimized for a particular performance metric to suit a specific use scenario.

In some embodiments, certain groups of the spreading sequences may be enabled for use or disabled so that they cannot be used. Such functionality is explicitly informed or signalled to the UEs by the base station or to the base station by the UE (i.e. signaled in uplink and downlink). Such signaling may be implicit, i.e., the UE or the base station may treat a certain combination of parameters of a configuration as an indication of a disable or enable indication. Such parameters that are used for the implicit signaling may be parameters that are NoMA related or not NoMA related.

In some embodiments, a table representing the pool of spreading sequences can be structured to have a different number of sequences per group than that shown in the example of FIG. 7. By specifying the number of groups and sequences per group, the base station and the UE may be able to reach an agreement on a certain pool of spreading sequences that can be used for different operational regions or different use cases. For example, for high spectral efficiency (SE) transmission, a table with two spreading sequences per group can be configured for two layers per UE. In another example, low PAPR sequences with a single sequence per group are configured. Embodiments that include a single sequence per group may be useful for low PAPR transmission. In some spreading sequence arrangements, groups with different numbers of sequences are permitted. For example, a first group may have multiple spreading sequences while a second group has only one spreading sequence.

While some embodiments may include the groups and the spreading sequences within the groups organized or presented in a tabular form as described above, other embodiments may store or generate the groups and the spreading sequences in a form other than the tabular form. As an example, spreading sequences may be stored, generated or presented in a matrix format. In matrix $W_2$ shown below, the matrix contains a groups of spreading sequences in which each column of the matrix is a respective spreading sequence:

$$W_2 = \begin{bmatrix} 1 & 1 & 1 & 1 \\ 1 & j & -j & -1 \\ 1 & -1 & -1 & 1 \\ 1 & -j & j & -1 \end{bmatrix}.$$

The spreading sequences in the example of matrix $W_2$ happen to correspond to the first group of spreading sequences in the tabular form of FIG. 7, i.e. the first row. This example is not intended to limit what could be formatted in the matrix form.

In some embodiments, spreading sequences in different groups can be obtained by an matrix operation such as $$s = \alpha U W_1^{\{p\}}$$

where $U = \text{diag}(W_2^{(q)})$ and $W_2^{(q)}$ denotes a vector defined by a q-th column of matrix $W_2$ and $\alpha$ is a normalization factor. $W_1^{\{p\}}$ denotes a matrix defined by columns given by the set $\{p\}$ of a matrix $W_1$ where $$W_1 = [w_0, \ldots, w_{15}]$$

and $w_0 = [1, 1, 1, 1]^T$, $w_1 = [1, 1, -1, -1]^T$, $w_2 = [1, 1, -j, -j]^T$, $w_3 = [1, 1, j, -j]^T$, $w_4 = [1, -1, -j, -j]^T$, $w_5 = [1, -j, 1, j]^T$, $w_6 = [1, -j, -1, -i]^T$, $w_7 = [1, -j, -j, -1]^T$, $w_8 = [1, 1, 1, -j]^T$, $w_9 = [1, 1, -1, j]^T$, $w_{10} = [1, 1, -j, 1]^T$, $w_{11} = [1, 1, j, -1]^T$, $w_{12} = [1, -j, 1, 1]^T$, $w_{13} = [1, -j, -1, -1]^T$, $w_{14} = [1, -j, -j, j]^T$, $w_{15} = [1, -j, 1, -j]^T$.

The group and the spreading sequences within the group can be obtained by using different column indices of $W_2$ (i.e., q value(s)) and $W_1$ (i.e., set of $\{p\}$). The UE and base station may exchange information and values of column indices of $W_2$ and $W_1$ to communicate a pool of sequences that can be selected from.

In some embodiments, $W_2$ can be obtained by using a fast Fourier transform (FFT) algorithm. FFT algorithms are often readily available in hardware or computing chips. As such, the form of representation of the spreading sequences may have an implication on practical implementation. In tabular form, tables of groups of spreading sequences may be pre-stored in a memory of a device and so there may be a benefit of less processing and power consumption as the sequences do not need to be generated, but a drawback of additional memory being used to store the spreading sequence pool. On the fly generation of the spreading sequences and groups by using a formula has the advantage of a low memory usage requirement and low hardware/algorithm upgrade for implementation, but with a drawback of some additional processing and power consumption.

In another example, shown in FIG. 9, 12 sparse spreading sequences, each represented as a vector, for SF=4 are divided into three groups, each group having four spreading sequences. It is to be understood that the grouping of spreading sequences in this format is not intended to limited to this exact format. The number of spreading sequences, the number of groups and the number of spreading sequences per group are implementation specific.

With reference to FIG. 9, the listed sequences can obtain or emulate a 16-point SCMA codebook. For example, a first pair of spreading sequences in Group 1, i.e., $$\begin{bmatrix} 1 \\ 2 \\ 0 \\ 0 \end{bmatrix}, \begin{bmatrix} 2 \\ -1 \\ 0 \\ 0 \end{bmatrix},$$

when used in a transmitter with QPSK modulation in each branch, will generate a 16-point SCMA code with a sparsity pattern [1 1 0 0]. This sparsity pattern indicates that the first two REs are non-zero, while the other two are zeros. In other words, the first pair of spreading sequences in Group 1 may be used to produce $[s_1\ s_2\ 0\ 0]^T$ where $s_1$ and $s_2$ are two symbols of the 16-point SCMA codebook.

Further to this example, the second pair of spreading sequences in Group 1, i.e., $$\begin{bmatrix} 0 \\ 0 \\ 1 \\ 2 \end{bmatrix}, \begin{bmatrix} 0 \\ 0 \\ 2 \\ -1 \end{bmatrix},$$

when used in the transmitter with QPSK modulation in each branch, will generate a 16-point SCMA code with sparsity pattern [0 0 1 1]. In other words, the second pair of spreading sequences in Group 1 may be used to produce $[0\ 0\ x_1\ x_2]^T$ where $x_1$ and $x_2$ are two symbols of the 16-point SCMA codebook.

Since the two emulated 16-point SCMA codes generated from the spreading sequences in Group 1 are orthogonal to each other, i.e., $[s_1\ s_2\ 0\ 0]^T \perp [0\ 0\ x_1\ x_2]^T$, a transmitter may use the sequences in Group 1 to emulate an SCMA 16 point codebook.

As described earlier, it is desirable to assign or select orthogonal (or least minimally-correlated) sequences to branches in a multi-branch transmitter because the multi-branch transmission can be more easily separated at the receiver, as compared to non-orthogonal (or more highly-correlated) assignment/selection of sequences to branches.

Moreover, groups of orthogonal sequences in a sequence pool can be especially advantageous in a multi-branch transmitter because the multi-branch transmitter may be readily adapted to emulate one or more SCMA codebooks.

Any arbitrary combination of sequences, and more particularly non-orthogonal groupings of sequences, may not produce the desired outcome of emulating SCMA codebooks. For example, in FIG. 9, an assignment of sequence $$\begin{bmatrix} 1 \\ 2 \\ 0 \\ 0 \end{bmatrix}$$

to one branch and sequence $$\begin{bmatrix} 0 \\ 0 \\ 1 \\ 2 \end{bmatrix}$$

to another branch, does not result in an output that is a 16-point SCMA symbol. Assignment of arbitrary sequences to multi-branch can lead to poor performance in terms of BLER and throughput. Therefore, in some embodiments, sequences in different branches may have particular associations/relationships. For example, the choice of a sequence for one branch may obligate use of a specific sequence(s) in other branch(es). In another example, the choice of a sequence for one branch may prevent the use of a specific sequence(s) in other branch(es). As such, relationships/associations among sequences may directly or indirectly influence, or set rules, on the sequence assignment to a UE, or more specifically to the branches. Such rule(s)/association(s)/relationship(s) may be pre-defined and known to the UE side and/or the base station/network side. Such rule(s)/association(s)/relationship(s) among sequences and their assignment(s) may relate to a performance metric such as PAPR, CM, SE, BLER performance or parameters such as TBS, MCS, modulation order, FEC code rate, other NoMA related configurations such as bit level processing parameters, single/multi-branch transmission or parameters/configurations that are not NoMA related. In some embodiments, such rule(s) may be dynamically or semi-dynamically signalled/informed by the base station/network or the UE side through RRC, DCI or MAC-CE or a similar type of signalling mechanism. Alternatively, implicit indication of such rule(s)/association(s)/relationship(s) is possible. Such rule(s)/association(s)/relationship(s) may be specific to the type of NoMA signal, such as sparse or non-sparse. Such rule(s)/association(s)/relationship(s) may be utilized regardless of whether multi-branch transmission is supported or not. For example, when the base station and the UE agree to or assign for multi-branch transmission, rule(s)/relationship(s)/association(s) to be used for multi-branch sequence assignment may be activated.

Different sizes of groups and/or pools of sequences are useful for diverse usage scenarios. For example, for a mMTC use scenario a large pool size is typically needed to support a large number of potential UEs while for URLLC/eMBB use scenarios, a smaller pool size is usually sufficient because the potential number of UEs is smaller. It should be appreciated that single sequence or multi-sequence output can be further expanded for a larger pool/group in a method as described below. The sequences $$\begin{bmatrix} 1 \\ 2 \end{bmatrix} \text{ and } \begin{bmatrix} 2 \\ -1 \end{bmatrix}$$

in two branches can produce the 16-point SCMA symbols (without sparsity). A desired sparsity pattern can be part of the sequence or part of the symbol-to-RE mapping block. The output, i.e., 16-point SCMA symbols can be expanded by multiplication of $$\begin{pmatrix} s_1 \\ s_2 \end{pmatrix}$$

by one of the matrix of the set $$\left\{ \begin{pmatrix} 1 & 0 \\ 0 & 1 \end{pmatrix}, \begin{pmatrix} 1 & 0 \\ 0 & -1 \end{pmatrix}, \begin{pmatrix} 1 & 0 \\ 0 & j \end{pmatrix}, \begin{pmatrix} 1 & 0 \\ 0 & -j \end{pmatrix}, \begin{pmatrix} 0 & 1 \\ 1 & 0 \end{pmatrix}, \begin{pmatrix} 0 & 1 \\ -1 & 0 \end{pmatrix}, \begin{pmatrix} 0 & 1 \\ j & 0 \end{pmatrix}, \begin{pmatrix} 0 & 1 \\ -j & 0 \end{pmatrix} \right\}.$$

Similarly, single branch output of a linear spreading sequence, sparse spreading sequence or non-sparse spreading sequence can also take advantage of such extension. The expanding set of matrices should be appropriately selected to suit the sequence length and other system parameters. Selected group(s), sequence(s) or the entire pool may be expanded. It should be noted that matrix/vector representation is only for notational convenience and implementation and representation can be different. For example, matrix multiplication may be expressed as element wise multiplication.

Parameters that define a spreading sequence, including the spreading sequence length, the spreading sequence types (i.e., ultra-sparse, sparse, non-sparse) and spreading sequence grouping parameters N, M for each type, can be defined or pre-configured by the network. In some embodiments, the spreading sequence pool is a fixed pool of spreading sequences and is pre-stored in the network or the UE, or both. For example, the pool of spreading sequences can be stored in the UE when the UE is purchased or already stored in the network when the UE first accesses the network. In some embodiments, the base station informs the UE of the spreading sequence pool parameters by using signaling such as higher-layer signaling e.g. radio resource control (RRC) or media access control-control element (MAC-CE) messages. In the case of grant-free (or configured grant) transmission, in some embodiments, the pool parameters can be regarded as one field of resources to be signaled. In some scenarios, dynamic signaling can also be used for configuration of the spreading sequence pool or portions of the spreading sequence pool. Dynamic signaling may include, for example, using downlink control information (DCI) signaling. In some embodiments, pre-configured sequence pool information and values of N or M, or both, are dynamically signaled to the UE. In some embodiments, these parameters can be configured at a transmission initialization stage.

The configuration of the spreading sequence pool parameters may be based on the spreading sequence types. In some embodiments, pools of each spreading sequence type may be configured. The configuration may depend on a receiver type or a receiver capability. For example, sparse spreading sequences may be associated with a chip-wise receiver such as chip-MMSE. In some embodiments, the spreading sequences in the spreading sequence pool may depend on traffic loading. The loading of the system may be determined by long term or short term traffic measurements or observations. In some embodiments, the configuration of the spreading sequence pool may be determined by a number of UEs that can be active, potentially active, transmitting or potentially transmitting simultaneously. For example, a large value of N may be required for a massive machine type communication (mMTC) scenario where the number of potential UEs or streams are expected to be high. Alternatively, a small value of N is sufficient for ultra-reliable low latency communication/enhanced mobile broadband (URLLC/eMBB) where the potential number of UEs or streams is small in comparison.

In some embodiments, a single pool is defined or configured. In some embodiments, multiple pools of mixed spreading sequence types may be defined or configured.

In some embodiments, a number of groups, i.e. N, for each spreading sequence type may be determined based on a use scenario, for example, a number of UEs that can be potentially active. In some embodiments, a large N is required for mMTC scenario while a small N is sufficient for URLLC/eMBB. In addition to the use scenario (e.g. mMTC, eMBB, URLLC), N can also be determined based on TBS, MCS, target performance, etc.

In some embodiments, a number of sequences in a group, M can be determined by a maximum number of allowed streams per UE. For example, M may be determined in order to reduce a search space for UE activity detection or to achieve high performance, such as SE, while having a reasonable receiver complexity. Determination of M can be based on the use scenario (e.g., mMTC, eMBB, URLLC), TBS, MCS, target performance, etc. The value of M can be chosen to reduce signaling overhead of the system depending on a use case or particular application scenario.

In some scenarios, M=1, i.e., the size of the spreading sequences in each group is 1. In another scenario N=1, i.e., the number of groups in the pool is 1.

In addition to defining the pools of spreading sequences as described above, aspects of the disclosure also pertain to methods for assigning, by the base station, to the UE and selection of the spreading sequence type by the UE. Assigning by the base station is more suitable for a grant-based transmission scenario. Selecting by the UE is more suitable for a grant-free or configured grant scenario.

In some embodiments, selection of a spreading sequence may start with selection of a spreading sequence type having an associated index. A spreading sequence type index (STI) can be determined by the base station and signaled to the UE. The STI can be signaled to the UE in a dynamic, static or semi-static manner through available signaling channels by using RRC/MAC-CE/DCI messages. The signaling can be L1 signaling or higher-layer signaling. The base station or network may request that the UE perform certain measurements such as signal-to-interference noise ratio (SINR) and report that information back to the base station, or network, to assist the spreading sequence assignment process.

In some embodiments, the STI can be determined by the UE based on feedback from the base station. For example, a receiver capability, a receiver type, or traffic load, or combination thereof, can be signaled by the base station. The UE can then select a spreading sequence pool, a spreading sequence type, one or more spreading sequence, a group of spreading sequences to select from, or combination thereof, based on these parameters. In another scenario, communication parameters such as TBS, MCS and SE may be used to determine a selection of the spreading sequence pool, a spreading sequence type, one or more spreading sequence, a group of spreading sequences to select from, or a combination thereof. In some scenarios, a combination of information received from the base station and the communication parameters such as TBS, MCS and SE can be used to determine a spreading sequence pool, a spreading sequence type, one or more spreading sequence, the group of spreading sequences to select from, or a combination thereof, to be used in the NoMA signal. In some cases, the UE performs measurements such as SINR, interference to noise ratio (INR) or signal to interference ratio (SIR) that are used to assist the determination of the spreading sequence pool, spreading sequence type, one or more spreading sequence, the group of spreading sequences to select from, or combination thereof, used in the NoMA signal. In some cases, the UE informs the base station of the spreading sequence pool, spreading sequence type, one or more spreading sequence, the group of spreading sequences to select from, or a combination thereof, used by the UE in the NoMA signal. In some scenarios, the UE may inform only a portion of the information, such as the group, but the base station or another network side device performs a blind mechanism to identify the particular spreading sequence within that group. In some cases, the spreading sequence can be associated with a group. For example, a sparse pattern may be associated with the group and therefore explicit reporting of the group is not necessary. Similarly, the spreading sequence, or the group, may be associated with some other system parameters related to NoMA. For example, certain groups or spreading sequences may be allowed only in certain SE/TBS/PAPR regions and therefore, explicit signaling may not be necessary. The base station may be able to implicitly determine the spreading sequence. In some cases, a UE identifier, or a range of UEs, can be associated with a group of spreading sequences. In some cases, the STI can be explicitly signaled by the UE or blindly detected at the base station, or implicitly known at base station by having a pre-defined mapping between the communication parameters and STI. In the case of blind detection by the base station, the blind detection can be facilitated by a mapping between demodulated reference signal (DM RS) and the STI.

In some embodiments, once the STI is determined, the spreading sequence group can be determined based on one or more of the following options. The signature group index (SGI) can be determined based on a UE identifier (UE id), such as a radio network temporary identified (RNTI) or other identifier. Such an association can be pre-configured at the UE as part of resource configuration in a configured grant transmission. Signaling can be based on higher-layer signaling (like RRC or MAC-CE) or based on dynamic signaling (DCI/L1). In some scenarios, the SGI can be determined by the UE based on a mapping rule between the UE id and the SGI, which is specified by the network. For example, the group index=mod(UE id, N), where the UE id is the RNTI, is related to a DMRS assignment or preamble sequence, etc. In another embodiment, the SGI is chosen at random. The same SGI can be used to configure multiple UEs.

In some scenarios, the SGI can also be determined based on a key performance indicator (KPI). For example, if some groups have better PAPR/CM properties, these groups might be assigned to the UEs with low-PAPR requirements. The SGI can be explicitly assigned by the base station through dynamic signaling. In some embodiments, more than one SGI can be assigned to a UE. The assignment, configuration or selection of multiple SGIs can follow the same procedure as the assignment, configuration or selection of a single SGI.

The spreading sequence index (or indices) can be chosen from the assigned or configured SGI by the UE. This selection may be more suitable for grant-based transmission. The sequence index (or indices) can be chosen from the selected SGI by the UE (both SGI and sequence index are choices of UE). This selection may be more suitable for grant-free or configured grant transmission.

As the spreading sequences in a group are orthogonal by design, there is no inter-branch interference in the case of multi-branch transmission. A number of branches or streams used for transmission is implicitly known to UEs by defining a mapping between a number of streams to TBS, MCS, target performance (such as SE, PAPR, CM, receiver capability, etc). For example, in grant-free transmission, a number of branches can be associated or pre-defined to a certain TBS or SE range. In some embodiments, multi-stream or multi-branch NoMA transmission is used in conjunction with rate matching or an MCS table, or both. Single-stream (single branch) or multi-stream (multi-branch) can be pre-configured or can be performed by dynamic switching. The base station can explicitly signal a multi-stream (multi-branch) transmission enable or disable indication. For example, in grant-based based transmission, the UE may be informed of the enabling or disabling of a multi-branch transmission. Multi-streams in NoMA can occur because of segmentation, i.e. single transport block and/or code blocks are segmented and mapped to multi-streams of NoMA. Multiple transport blocks can also be mapped directly to multi-streams of NoMA.

Once a number of branches, L, is determined for a multi-branch implementation, spreading sequence indices $\{i_1, i_2, \ldots, i_L\}$ can be determined. In some embodiments, the spreading sequence indices can be determined by defined KPI for a user, for example, if a UE requires low-PAPR transmission, the UE can be assigned by the base station, or the UE can select, the lowest indices assuming that the sequences are ordered from lowest to highest PAPR/CM. If the UE is close to the cell-edge the start index may be 0. In some embodiments, for low-PAPR transmission only one spreading sequence is in a group, i.e. a single index.

In some scenarios, the spreading sequence assignment or configuration by the base station, or the selection by the UE, can be determined based on use scenario such as mMTC/eMBB/URLLC or traffic load, etc. When a number of UEs is large (heavily loaded) or for a grant-free transmission scenario, or both, interference randomization is useful for better performance, for example in mMTC use case. In this case, spreading sequence indices change from block to block based on a pre-defined hopping pattern or a random hopping pattern, but the spreading sequences are still selected from a same group. When the system is lightly loaded or for a grant-based transmission scenario, or both, a deterministic assignment of sequences may be used, for example, for eMBB, URLLC use cases.

In some embodiments, the spreading sequence indices are determined based on a UE identifier (UE id). The spreading sequence indices are selected based on a start index, which determines the index of a first sequence, a step size, which defines a distance between adjacent spreading sequence indices, and a direction. The direction can be left or right in the case of a horizontally presented set of indices, for example as shown in the tables of FIGS. 10A and 10B, which will be described in further detail below. In other cases, the direction can be considered as incremental or decremental. For example, incremental or decremental direction with a fixed step size can be implemented. In another example, incremental/decremental direction with a UE dependent step size can be used. A UE start index can be mapped to a UE id and then the start index=mod(UE id, M).

In another example, the UE receives/decides upon a start index i and a direction indication d for multi-layer (multi-branch) transmission and the index/indices to be used by UE is/are computed by i+(2d−1)l−1 where l is the number of branches of the transmission and l∈{1, 2, ... }d=1 and d=0 take indices right and left to the original index, respectively.

The configuration signaling for all of these options can be performed using any of RRC/DCI/MAC-CE signaling.

In some embodiments, a spreading sequence assignment can be associated with a UE id such as RNTI or other type of identifier. FIG. 10A includes a table illustrating a pool of groups of four spreading sequences, each group having a Group index and an associated UE id index. Only a single group is shown, but it is understood that others could be included in the pool. The table in FIG. 10A includes a particular entry for a set of two UEs (UE-1 and UE-2), having a UE id "UE-1, UE-2". The UEs are associated with a Group index of "1". The two UEs are configured to start at different spreading sequence start indices. For a single-branch scenario, UE-1 starts at spreading sequence index 0 and UE-2 starts at spreading sequence index 2. For a multi-branch transmission scenario, the UEs may start at the same respective spreading sequence index as for the single-branch case and further use a directionality that is either incremental (to the right) or decremental (to the left) for subsequent selection of spreading sequences. In the case of FIG. 10A, the directionality for both UE-1 and UE-2 is incremental (to the right).

FIG. 10B includes another tabular example for a particular entry of a set of two UEs (UE-1 and UE-2), having a UE id "UE-1, UE-2". FIG. 10B includes a table illustrating a pool of groups of four spreading sequences, each group having a Group index and an associated UE id index. Only a single group is shown, but it is understood that others could be included in the pool. The UEs are associated with a Group index of "1". UE-1 and UE-2 both use spreading sequence index 0 for single-branch. For multi-branch, again both UE-1 and UE-2 use spreading sequence index 0 as a spreading sequence for a first branch. For a subsequent spreading sequence UE-1 uses a step size 2 incremental (to the right) so that a spreading sequence for a subsequent branch is spreading sequence index 2. For a subsequence spreading sequence UE-2 uses a step size 1 incremental (to the right) so that a spreading sequence for a subsequent branch is spreading sequence index 1.

In another example, UE-1 and UE-2 both use index 0 for single-branch transmission. For multi-branch transmission, both UE-1 and UE-2 use index 0 as a first branch spreading sequence and the UEs then each follow a hopping pattern within the same group to select spreading sequences for other branches. The hopping pattern can be defined based on a start index, a step size and a direction. As an example, a UE-1 hopping pattern can be defined as {0, 2, 0, 2, ... } and a UE-2 hopping pattern can be defined as {0, 1, 2, 3, 0, 1, ... }.

In some embodiments, hopping is restricted to a group (the sequence indices of a group). In some embodiments, a UE hopping pattern involves sequences in another group. In some embodiments, a UE hopping pattern is sequence hopping only where the hopping pattern involves sequences of a single group. In the sequence hopping only scenario, the group index and/or hopping patterns is/are signalled through RRC, MAC-CE or DCI. In some embodiments, a UE hopping pattern is group hopping only where the hopping pattern involves multiple groups of the same sequence. In the group hopping only scenario, the sequence index and/or hopping pattern is/are signalled through RRC, MAC-CE or DCI. In some embodiments, a UE hopping pattern is group and sequence hopping where the hopping pattern involves multiple groups and sequences. In the group and sequence hopping scenario, the start sequence index, group index and/or hopping pattern is/are signalled through RRC, MAC-CE or DCI. In some embodiments, a group index and/or a sequence index is assigned by defining a mapping function. For example the group index can be obtained by mod(UE id, number of groups) or sequence index can be obtained by mod(UE id, number of sequences per group) where mod(x, y) is x modulo y. In another example with sequence hopping only, group hopping only or sequence and group hopping scenarios, a mapping function may define the start index. In another example, indices in various scenarios may be obtained partly by signalling (eg. RRC, MAC-CE, DCI) and partly by a mapping function.

In some embodiments, the group index and/or sequence index is/are signalled or obtained by a mapping function or otherwise. In some embodiments, the start group index and/or start sequence index and/or hopping patterns is/are signalled or obtained by a mapping function or otherwise. Therefore, in some embodiments, sequence and/or groups may or may not be ordered/sorted according a certain transmission metric.

In some embodiments, a discrete Fourier transform (DFT) can be used to generate a spreading sequence pool. DFT spreading sequences may be of particular interest as such sequences can be readily available in hardware/chipset in the form of FFT algorithm.

In a particular example, a spreading sequence is generated from an L point DFT $s[k, m_0]=\text{fft}(a[m-m_0])$, k=0, 1, ..., L−1, where $m_0=0, 1, \ldots, L-1$ and a[m]=[1, 0, ..., 0] is sequence of length L having a first element equal to 1 and the other L−1 elements are zeros. By definition, the FFT of sequence. $\tilde{s}[m]$ is given as $$\text{fft}(\tilde{s}[m]) = \sum_{m=0}^{L-1} \tilde{s}[m] e^{-j\frac{2\pi}{L}mk}.$$

For any spreading length L, groups of spreading sequences arranged in an order that correspond to an increasing PAPR/CM metric can be formed as follows:
s[k,p], s[k, q] produce similar PAPR/CM when p, q=1, ..., L−1 and p<q, q=L−p.
s[k, $r_1$] produces a lower PAPR than s[k, $r_2$] when $r_1 \le r_2$ and $r_1, r_2=1, \ldots,$ $$\left\lfloor \frac{L-1}{2} \right\rfloor$$

where $\lfloor x \rfloor$ is the floor of x (i.e., greatest integer less than or equal x).

Define the i index cluster as $\Omega_i(p, \ldots, q)$ formed by sequences s[k,p], ..., s[k, q] and $\Omega_i (p, \ldots, q) \triangleq \{s[k, p], \ldots, s[k, q]\}$.

When L is even, the spreading sequence corresponds to $$m_0 = \frac{L}{2} \left( \text{i.e., } s\left[k, \frac{L}{2}\right] \right)$$

and the spreading sequence will be in a separate group having only one sequence and has a highest PAPR/CM value.

A spreading sequence corresponding to $m_0=0$ (i.e., $s[k, 0]$) will be in a separate group having only one sequence and has a PAPR/CM value substantially equal to L=1, i.e. a spreading length of 1 $s[k, 0]=1_L$ where $1_L$ is sequence of L number of 1s;

$$s[k, 0] = \mathit{fft}(a[m]) = e^{-j\frac{2\pi}{L}.0.k}, \forall k.$$

Spreading sequences formed using DFT $s[k, m_0]$, $m_0=0, \ldots, L-1$ are an orthogonal set of sequences $s[k, p] \perp s[k, q]$ for $p \neq q$.

Using the above mentioned mechanism, an MA spreading sequence pool can be defined taking spreading sequences from groups with low and high metric (PAPR/CM). For example for spreading sequence pool size of 8, the PAPR value of each cluster is related as: $f(\Omega_0) \leq f(\Omega_1) \leq f(\Omega_2) \leq f(\Omega_3) \leq f(\Omega_4)$, where $\Omega_0=\{s[k, 1], s[k, 7]\}$, $\Omega_1=\{s[k, 2], s[k, 6]\}$, $\Omega_2=\{s[k, 0]\}$, $\Omega_3=\{s[k, 3], s[k, 5]\}$, $\Omega_4=\{s[k, 4]\}$.

The groups can be arranged into M sets. For example, M=2 leads to two sets: $\{\Omega_0, \Omega_1\}$ and $\{\Omega_2, \Omega_3, \Omega_4\}$.

The cartesian product of spreading sequences in M sets of groups produces a MA spreading sequence pool. Such spreading sequences can have the properties described above for multi-stream transmission and result in low PAPR transmission. Depending on the size of the pool required (i.e., N), certain choices can be removed based on some performance criteria such as inner product. For example, the pool size can be increased to accommodate more sequences/signatures. Alternatively, if demand for the number of sequences is low, more highly correlated sequences could be removed from the pool, thereby keeping more highly orthogonal/less highly correlated sequences.

FIG. 11 illustrates a tabular form of pairs of spreading sequences in four groups, i.e. a pool for N=4, M=2. Such a pool of spreading sequences allows for a selection of spreading sequences, for each of two layers or branches, from a low-PAPR group and a high PAPR group.

Figure 12:
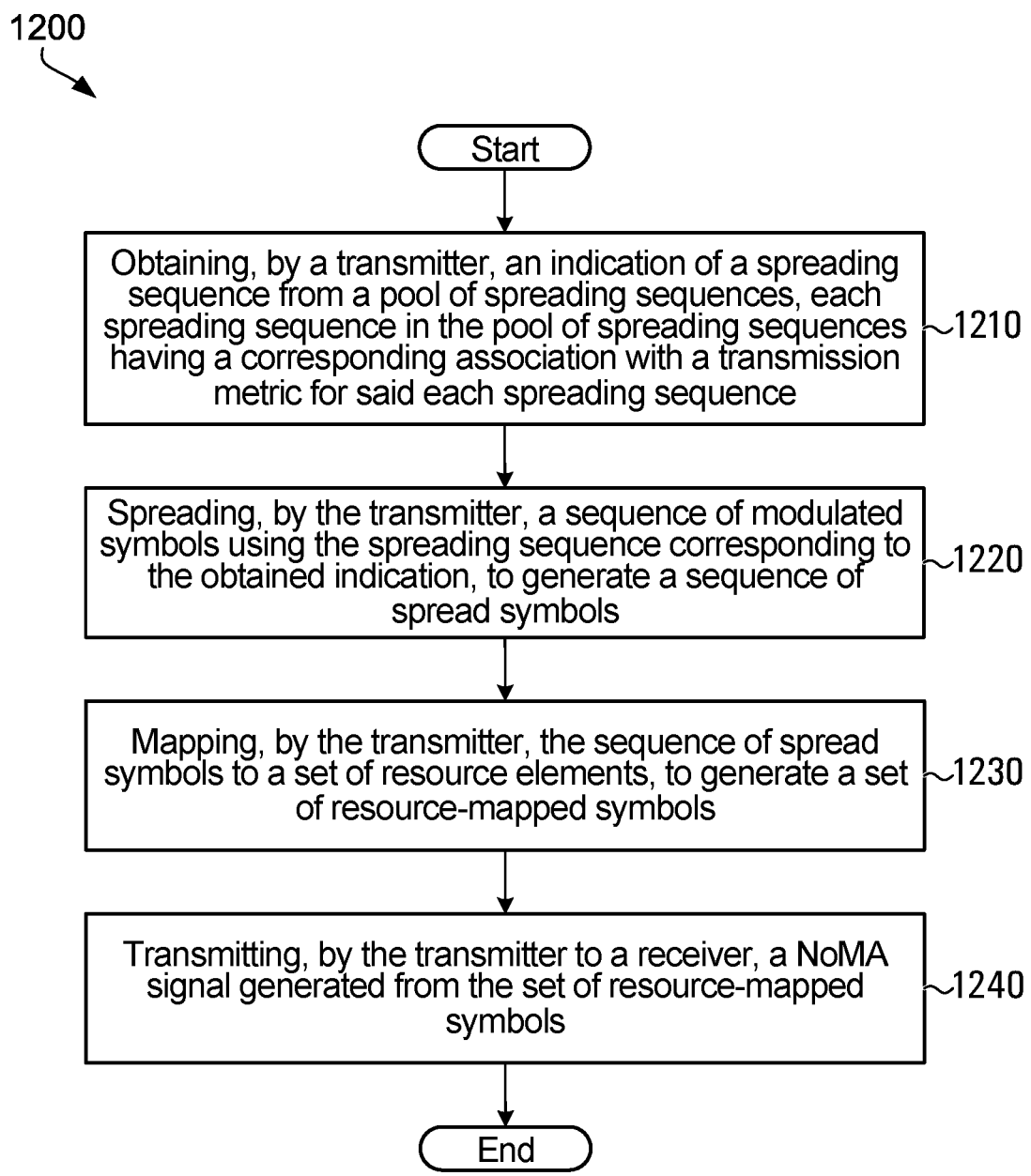
FIG. 12 is a flowchart illustrating a first example method for use by a transmitter of transmitting a NoMA transmission according to an aspect of the disclosure.

While certain aspects of the present disclosure are particularly applicable to NoMA schemes that employ spreading, some aspects of the present disclosure also provide benefits to other NoMA schemes in general and, therefore, are not limited to any specific spreading schemes. Specifically, aspects of the present disclosure also describe implementations of generalized MA signature generation, which includes other operations such as scrambling and interleaving, in addition to spreading FIG. 12 is a flow chart illustrating a method 1200 for use in a transmitter according to as aspect of the present disclosure. Step 1210 involves obtaining, by the transmitter, an indication of a spreading sequence from a pool of spreading sequences. Each spreading sequence in the pool of spreading sequences has a corresponding association with a transmission metric. The transmission metric may be a performance metric.

The performance metric is at least one of: power amplifier efficiency; power amplifier power consumption; cubic metric (CM); peak to average power ratio (PAPR); reliability including block error rate (BLER); transmission block size (TBS); modulation and coding scheme (MCS); spectral efficiency; overloading capability; receiver capability; receiver type; traffic load and characteristics; allocated bandwidth; signaling overhead; maximum coupling loss (MCL) range; number of active user equipments (UEs); and latency.

In some embodiments, obtaining the indication involves receiving, by the transmitter, higher layer signaling explicitly or implicitly indicating the spreading sequence. The higher layer signaling may include at least one of: a type of spreading sequence to be used by the transmitter; a number of spreading sequences per group a number of groups of spreading sequences; a performance metric; and a user equipment identifier.

In some embodiments, obtaining the indication involves, selecting, by the transmitter, the spreading sequence from the pool of spreading sequences. This may be the case for instance with configured grant transmission. Selecting the spreading sequence may be based on at least one of: a network access device receiving type and/or capability; traffic load; traffic characteristics; signal to interference and noise ratio; interference to noise ratio; and signal to interference ratio.

In some embodiments, the method can apply to a multi-branch transmission in which the transmitter includes at least two branches and a different spreading sequence is used for each branch.

Step 1220 involves spreading, by the transmitter, a sequence of modulated symbols using the spreading sequence corresponding to the obtained indication to generate a sequence of spread symbols.

Step 1230 involves mapping, by the transmitter, the sequence of spread symbols to a set of resource elements to generate a set of resource-mapped symbols.

Step 1240 involves transmitting, by the transmitter to a receiver, a non-orthogonal multiple access (NoMA) signal generated from the set of resource-mapped symbols.

Figure 13:
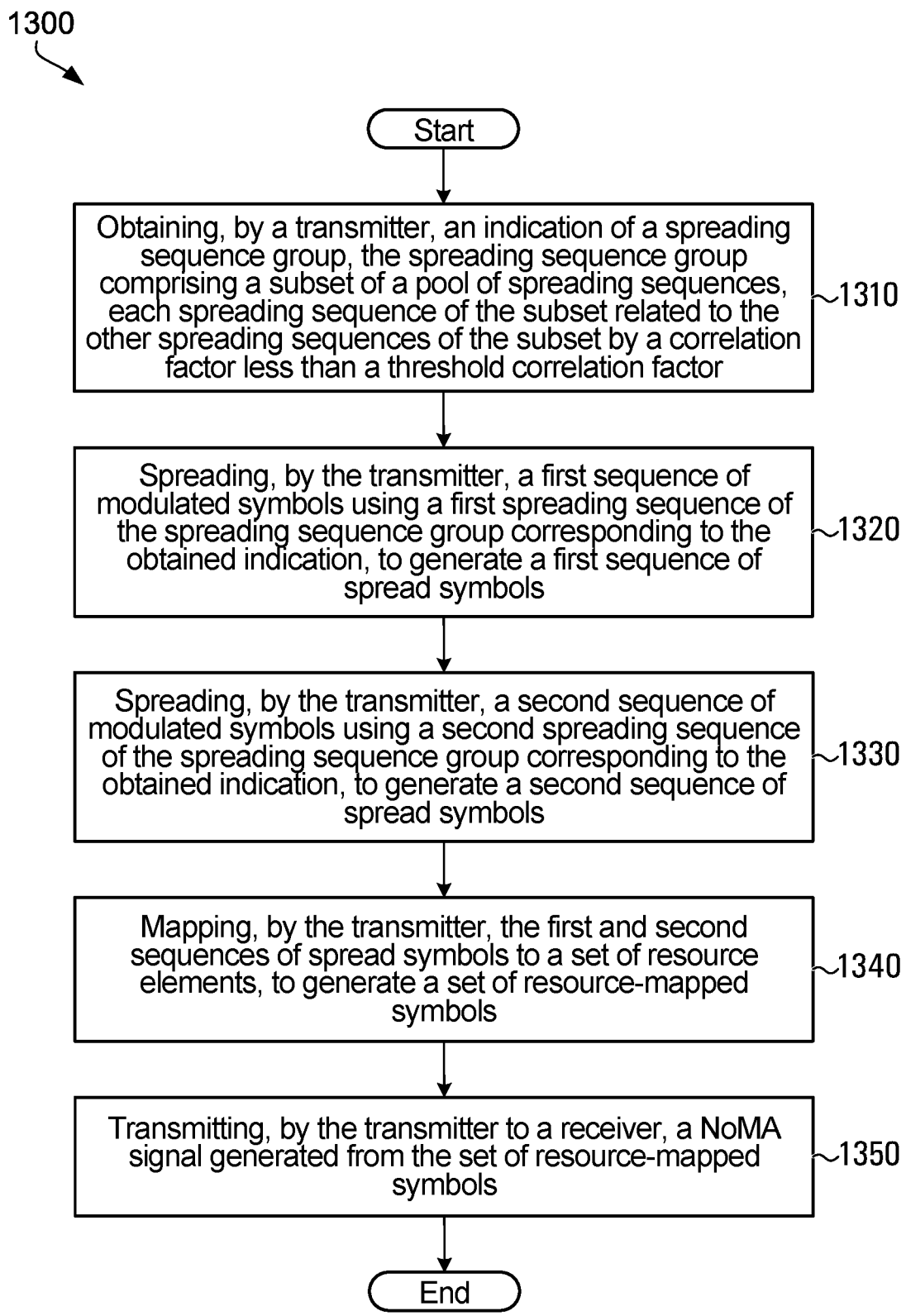
FIG. 13 is a flowchart illustrating a second example method for use by a transmitter of transmitting a NoMA transmission according to an aspect of the disclosure.

FIG. 13 is a flow chart illustrating a method 1300 for use in a transmitter according to as aspect of the present disclosure. FIG. 13 is directed to a multi-branch transmission in which the transmitter includes at least two branches and a different spreading sequence is used for each branch.

Step 1310 involves obtaining, by the transmitter, an indication of a spreading sequence group. The spreading sequence group includes a subset of a pool of spreading sequences. Each spreading sequence of the subset is related to the other spreading sequences of the subset by a correlation factor less than a threshold correlation factor. As the correlation properties among spreading sequences can vary significantly due to the way the sequences are constructed, in order to separate the UEs/streams at the receiver side, it is important that a subset of spreading sequences have similar correlation properties. For example, a particular subset may be generated such that all of the spreading sequences have a correlation factor equal to or great than 0.75. While 0.75 is merely an example, it is understood that the correlation factor could be higher or lower than 0.75 and can be implementation or usage scenario specific.

In some embodiments, the first spreading sequence and the second spreading sequence are orthogonal such that a correlation factor between the first and second spreading sequences is zero. In some embodiments, the first spreading sequence and the second spreading sequence are both associated with a same spreading factor. In some embodiments, the first spreading sequence and the second spreading sequence are associated with different spreading factors. In some embodiments, the first spreading sequence and the second spreading sequence are both associated with a same sparsity ratio. In some embodiments, the first spreading sequence and the second spreading sequence are both associated with different sparsity densities.

In some embodiments, obtaining the indication involves receiving, by the transmitter, higher layer signaling explicitly or implicitly indicating the spreading sequence group. In some embodiments, the higher layer signaling comprises at least one of: a type of spreading sequence to be used by the transmitter; a number of spreading sequences per group; a type of spreading sequence to be used by the transmitter; a number of spreading sequences per group a number of groups of spreading sequences; a performance metric; and a user equipment identifier.

In some embodiments, obtaining the indication involves selecting, by the transmitter, the spreading sequence group from a plurality of spreading sequence groups. Selecting the spreading sequence group is based on at least one of: a network access device receiving type and/or capability; traffic load; traffic characteristics; signal to interference and noise ratio; interference to noise ratio; and signal to interference ratio.

A number of spreading sequences in the spreading sequence group is based on at least one of: a maximum number of allowed streams used by the transmitter; a usage scenario for the transmitted NoMA signal; a receiver type and capability; a range of supporting transmission block size (TBS); a range of supporting modulation and coding scheme (MCS); and signaling overhead.

In some embodiments, each spreading sequence in the first spreading sequence group has a same first sparsity ratio and each spreading sequence in the second spreading sequence group has a same second sparsity ratio, which is different from the first sparsity ratio.

In some embodiments, the method further involves receiving, by the transmitter, at least one of a starting index for the first spreading sequence; a direction of increasing index or decreasing index to identify the second spreading sequence; and a hopping pattern of spreading sequence indices.

Step 1320 involves spreading, by the transmitter, a first sequence of modulated symbols using a first spreading sequence of the spreading sequence group corresponding to the obtained indication, to generate a first sequence of spread symbols.

Step 1330 involves spreading, by the transmitter, a second sequence of modulated symbols using a second spreading sequence of the spreading sequence group corresponding to the obtained indication, to generate a second sequence of spread symbols.

Step 1340 involves mapping, by the transmitter, the first and second sequences of spread symbols to a set of resource elements, to generate a set of resource-mapped symbols.

Step 1350 involves transmitting, by the transmitter to a receiver, a non-orthogonal multiple access (NoMA) signal generated from the set of resource-mapped symbols.

While FIGS. 12 and 13 are described from the point of view of the transmitter, it should be understood that there are methods from the point of view of a network side device, acting as a receiver, that involve transmitting information to the transmitter to configure the transmitter with a given spreading sequence or that can be used by the transmitter to select an appropriate spreading sequence. Also the network side device can receive information from the transmitter, such as measurements of SINR, INR, or the like, that allow the network to determine an appropriate spreading sequence or group of spreading sequences to configure the transmitter or can receive information form the transmitter explicitly or implicitly defining the spreading sequences selected by the transmitter.

Figure 14:
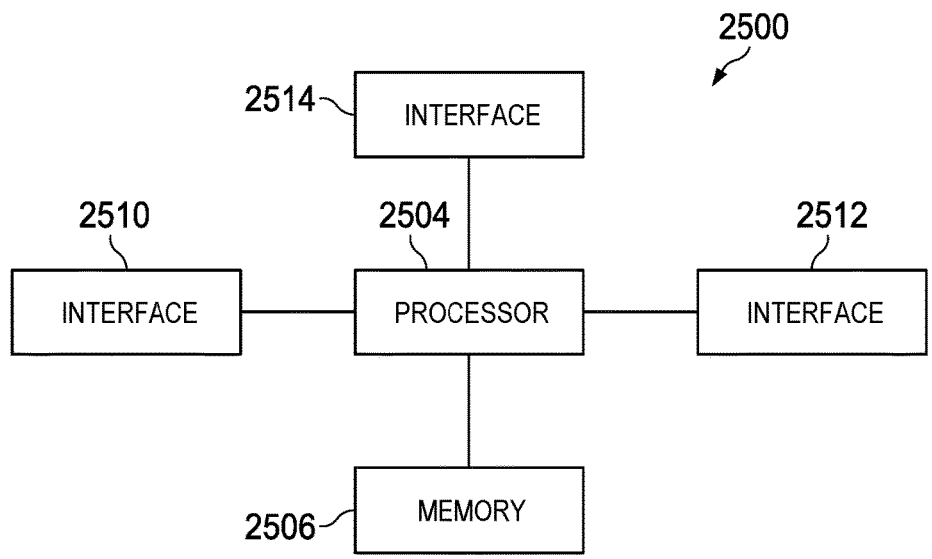
FIG. 14 is a block diagram of an embodiment processing system for performing methods described herein.

FIG. 14 illustrates a block diagram of an embodiment processing system 2500 for performing methods described herein, which may be installed in a host device. As shown, the processing system 2500 includes a processor 2504, a memory 2506, and interfaces 2510-2514. The processor 2504 may be any component or collection of components adapted to perform computations and/or other processing related tasks, and the memory 2506 may be any component or collection of components adapted to store programming and/or instructions for execution by the processor 2504. A means for configuring a transmitter and a receiver for a UE may include processor 2504. In an embodiment, the memory 2506 includes a non-transitory computer readable medium. The interfaces 2510, 2512, 2514 may be any component or collection of components that allow the processing system 2500 to communicate with other devices/components and/or a user. For example, one or more of the interfaces 2510, 2512, 2514 may be adapted to communicate data, control, or management messages from the processor 2504 to applications installed on the host device and/or a remote device. As another example, one or more of the interfaces 2510, 2512, 2514 may be adapted to allow a user or user device (e.g., personal computer (PC), etc.) to interact/communicate with the processing system 2500. The processing system 2500 may include additional components not depicted in FIG. 10, such as long term storage (e.g., non-volatile memory, etc.).

In some embodiments, the processing system 2500 is included in a network device that is accessing, or part otherwise of, a telecommunications network. In one example, the processing system 2500 is in a network-side device in a wireless or wireline telecommunications network, such as a base station, a relay station, a scheduler, a controller, a gateway, a router, an applications server, or any other device in the telecommunications network. In other embodiments, the processing system 2500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 2510, 2512, 2514 connects the processing system 2500 to a transceiver adapted to transmit and receive signaling over the telecommunications network.

Figure 15:
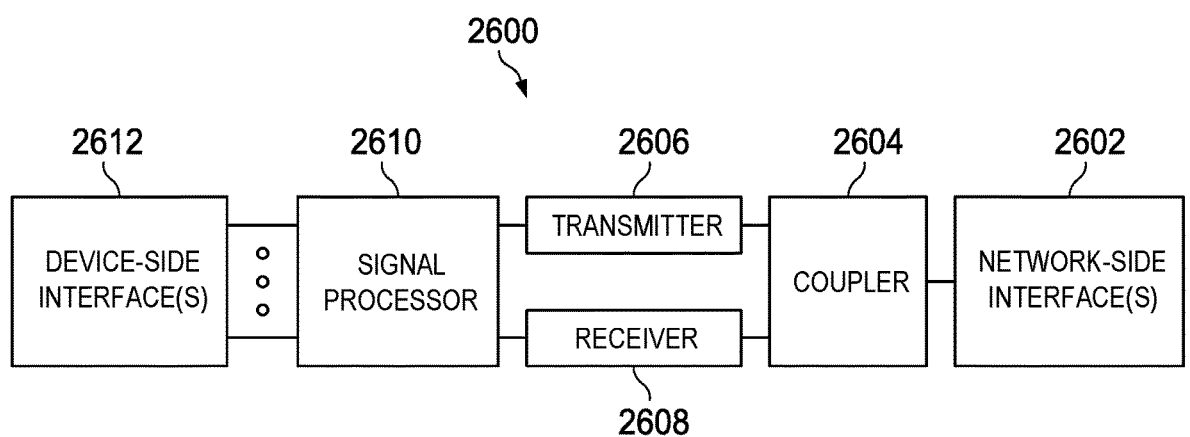
FIG. 15 is a block diagram of a transceiver adapted to transmit and receive signaling over a telecommunications network according to example embodiments described herein.

FIG. 15 illustrates a block diagram of a transceiver 2600 adapted to transmit and receive signaling over a telecommunications network. The transceiver 2600 may be installed in a host device. As shown, the transceiver 2600 comprises a network-side interface 2602, a coupler 2604, a transmitter 2606, a receiver 2608, a signal processor 2610, and a device-side interface 2612. The network-side interface 2602 may include any component or collection of components adapted to transmit or receive signaling over a wireless or wireline telecommunications network. The network-side interface 2602 may also include any component or collection of components adapted to transmit or receive signaling over a short-range interface. The network-side interface 2602 may also include any component or collection of components adapted to transmit or receive signaling over a Uu interface. The coupler 2604 may include any component or collection of components adapted to facilitate bi-directional communication over the network-side interface 2602. The transmitter 2606 may include any component or collection of components (e.g., up-converter, power amplifier, etc.) adapted to convert a baseband signal into a modulated carrier signal suitable for transmission over the network-side interface 2602. A means for transmitting an initial message of an access procedure may include transmitter 2606. The receiver 2608 may include any component or collection of components (e.g., down-converter, low noise amplifier, etc.) adapted to convert a carrier signal received over the network-side interface 2602 into a baseband signal. A means for receiving mobile subscriber identifiers, initial downlink messages of access procedures, and forwarded requests to connect to a network may include receiver 2608.

The signal processor 2610 may include any component or collection of components adapted to convert a baseband signal into a data signal suitable for communication over the device-side interface(s) 2612, or vice-versa. The device-side interface(s) 2612 may include any component or collection of components adapted to communicate data-signals between the signal processor 2610 and components within the host device (e.g., the processing system 2500, local area network (LAN) ports, etc.).

The transceiver 2600 may transmit and receive signaling over any type of communications medium. In some embodiments, the transceiver 2600 transmits and receives signaling over a wireless medium. For example, the transceiver 2600 may be a wireless transceiver adapted to communicate in accordance with a wireless telecommunications protocol, such as a cellular protocol (e.g., long-term evolution (LTE), etc.), a wireless local area network (WLAN) protocol (e.g., etc.), or any other type of wireless protocol (e.g., Bluetooth, near field communication (NFC), etc.).

In such embodiments, the network-side interface 2602 comprises one or more antenna/radiating elements. For example, the network-side interface 2602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

According to a first example of the disclosure, there is provided a method comprising: obtaining, by a transmitter, an indication of a spreading sequence from a pool of spreading sequences, each spreading sequence in the pool of spreading sequences having a corresponding association with a transmission metric for said each spreading sequence; spreading, by the transmitter, a sequence of modulated symbols using the spreading sequence corresponding to the obtained indication, to generate a sequence of spread symbols; mapping, by the transmitter, the sequence of spread symbols to a set of resource elements, to generate a set of resource-mapped symbols; and transmitting, by the transmitter to a receiver, a non-orthogonal multiple access (NoMA) signal generated from the set of resource-mapped symbols.

According to a first embodiment of the first example, the transmission metric is a performance metric that is at least one of: power amplifier efficiency; power amplifier power consumption; cubic metric (CM); reliability including block error rate (BLER); transmission block size (TBS); modulation and coding scheme (MCS); spectral efficiency; overloading capability; receiver capability; receiver type; traffic load and characteristics; allocated bandwidth; signaling overhead; maximum coupling loss (MCL) range; number of active user equipments (UEs); and latency.

According to a second embodiment of the first example, obtaining the indication comprises receiving, by the transmitter, higher layer signaling explicitly indicating the spreading sequence.

According to a third embodiment of the first example, obtaining the indication comprises receiving, by the transmitter, higher layer signaling implicitly indicating the spreading sequence.

According to a fourth embodiment of the first example, the higher layer signaling comprises at least one of: a type of spreading sequence to be used by the transmitter; a number of spreading sequences per group; a number of groups of spreading sequences; a performance metric; and a user equipment identifier.

According to a fifth embodiment of the first example, obtaining the indication comprises selecting, by the transmitter, the spreading sequence from the pool of spreading sequences.

According to a sixth embodiment of the first example, selecting the spreading sequence is based on at least one of: a network access device receiving type and/or capability; traffic load; traffic characteristics; signal to interference and noise ratio; interference to noise ratio; and signal to interference ratio.

According to a seventh embodiment of the first example, the seventh embodiment further comprising: wherein obtaining, by a transmitter, an indication of a spreading sequence from a pool of spreading sequences comprises: obtaining, by a transmitter, an indication of a spreading sequence group, the spreading sequence group comprising a subset of a pool of spreading sequences; and spreading, by the transmitter, a sequence of modulated symbols using the spreading sequence corresponding to the obtained indication, to generate a sequence of spread symbols comprises: spreading, by the transmitter, a first sequence of modulated symbols using a first spreading sequence of the spreading sequence group corresponding to the obtained indication, to generate a first sequence of spread symbols; spreading, by the transmitter, a second sequence of modulated symbols using a second spreading sequence of the spreading sequence group corresponding to the obtained indication, to generate a second sequence of spread symbols.

According to an eighth embodiment of the first example, the first spreading sequence and the second spreading sequence are orthogonal such that a correlation factor between the first and second spreading sequences is zero.

According to a ninth embodiment of the first example, the first spreading sequence and the second spreading sequence are both associated with a same spreading factor.

According to a tenth embodiment of the first example, the first spreading sequence and the second spreading sequence are associated with different spreading factors.

According to a eleventh embodiment of the first example, the first spreading sequence and the second spreading sequence are both associated with a same sparsity ratio.

According to a twelfth embodiment of the first example, the first spreading sequence and the second spreading sequence are both associated with different sparsity densities.

According to a thirteenth embodiment of the first example, obtaining the indication comprises receiving, by the transmitter, higher layer signaling explicitly indicating the spreading sequence group.

According to a fourteenth embodiment of the first example, obtaining the indication comprises receiving, by the transmitter, higher layer signaling implicitly indicating the spreading sequence group.

According to a fifteenth embodiment of the first example, the higher layer signaling comprises at least one of: a type of spreading sequence to be used by the transmitter; and a number of spreading sequences per group.

According to a sixteenth embodiment of the first example, obtaining the indication comprises selecting, by the transmitter, the spreading sequence group from a plurality of spreading sequence groups.

According to a seventeenth embodiment of the first example, selecting the spreading sequence group is based on at least one of: a network access device receiving type and/or capability; traffic load; traffic characteristics; signal to interference and noise ratio; interference to noise ratio; and signal to interference ratio.

According to a eighteenth embodiment of the first example, a number of spreading sequences in the spreading sequence group is based on at least one of: a maximum number of allowed streams used by the transmitter; a usage scenario for the transmitted NoMA signal; a receiver type and capability; a range of supporting transmission block size (TBS); a range of supporting modulation and coding scheme (MCS); and signaling overhead.

According to a nineteenth embodiment of the first example, the spreading sequence group is a first spreading sequence group of a plurality of spreading sequence groups, the plurality of spreading sequence groups further comprising a second spreading sequence group.

According to a twentieth embodiment of the first example, each spreading sequence in the first spreading sequence group has a same first sparsity ratio, and each spreading sequence in the second spreading sequence group has a same second sparsity ratio different from the first sparsity ratio.

According to a twenty-first embodiment of the first example, the first sparsity ratio corresponds to: a spreading sequence having only one non-zero element; a spreading sequence having at least two non-zero elements and at least one zero element; or a spreading sequence having no zero elements.

According to a twenty-second embodiment of the first example, the twenty-second embodiment further comprising: the transmitter receiving an indication of whether one or more spreading sequences is enabled or disabled for use by the transmitter.

According to a twenty-third embodiment of the first example, the indication is an explicit indication or an implicit indication.

According to a twenty-fourth embodiment of the first example, the twenty-fourth embodiment further comprising: prior to selecting the spreading sequence, receiving from a network access device, an indication of at least one of: the network access device receiving type and/or capability; and traffic load and characteristics; and the UE selecting the spreading sequence based on the received indication.

According to a twenty-fifth embodiment of the first example, the twenty-fifth embodiment further comprising: prior to selecting the spreading sequence, the transmitter performing measurements of at least one of: signal to interference and noise ratio; interference to noise ratio; and signal to interference ratio; and the transmitter selecting the spreading sequence based on the received indication.

According to a twenty-sixth embodiment of the first example, the twenty-sixth embodiment further comprising: the transmitter transmitting a notification to the network access device indicating one or more of: the spreading sequence selected by the transmitter; a group the spreading sequence has been selected from; and a spreading sequence type selected by the transmitter.

According to a twenty-seventh embodiment of the first example, each spreading sequence in the pool of spreading sequences has a corresponding association with a user equipment identifier (UE id) and obtaining the indication of a spreading sequence from a pool of spreading sequences comprises selecting the spreading sequence based the UE id.

According to a twenty-eighth embodiment of the first example, the type of spreading sequence is one of: a spreading sequence having only one non-zero element; a spreading sequence having at least two non-zero elements and at least one zero element; or a spreading sequence having no zero elements.

According to a twenty-ninth embodiment of the first example, the respective groups in the groups of spreading sequences and the respective spreading sequences in the groups are identified by an index value.

According to a second example of the disclosure, there is provided a method comprising: obtaining, by a transmitter, an indication of a spreading sequence group, the spreading sequence group comprising a subset of a pool of spreading sequences, each spreading sequence of the subset related to the other spreading sequences of the subset by a correlation factor less than a threshold correlation factor; spreading, by the transmitter, a first sequence of modulated symbols using a first spreading sequence of the spreading sequence group corresponding to the obtained indication, to generate a first sequence of spread symbols; spreading, by the transmitter, a second sequence of modulated symbols using a second spreading sequence of the spreading sequence group corresponding to the obtained indication, to generate a second sequence of spread symbols; mapping, by the transmitter, the first and second sequences of spread symbols to a set of resource elements, to generate a set of resource-mapped symbols; and transmitting, by the transmitter to a receiver, a non-orthogonal multiple access (NoMA) signal generated from the set of resource-mapped symbols.

According to a first embodiment of the second example, the first spreading sequence and the second spreading sequence are orthogonal such that a correlation factor between the first and second spreading sequences is zero.

According to a second embodiment of the second example, the first spreading sequence and the second spreading sequence are both associated with a same spreading factor.

According to a third embodiment of the second example, the first spreading sequence and the second spreading sequence are associated with different spreading factors.

According to a fourth embodiment of the second example, the first spreading sequence and the second spreading sequence are both associated with a same sparsity ratio.

According to a fifth embodiment of the second example, the first spreading sequence and the second spreading sequence are both associated with different sparsity densities.

According to a sixth embodiment of the second example, obtaining the indication comprises receiving, by the transmitter, higher layer signaling explicitly indicating the spreading sequence group.

According to a seventh embodiment of the second example, obtaining the indication comprises receiving, by the transmitter, higher layer signaling implicitly indicating the spreading sequence group.

According to an eighth embodiment of the second example, the higher layer signaling comprises at least one of: a type of spreading sequence to be used by the transmitter; a number of spreading sequences per group; a number of groups of spreading sequences; a performance metric; and a user equipment identifier.

According to a ninth embodiment of the second example, obtaining the indication comprises selecting, by the transmitter, the spreading sequence group from a plurality of spreading sequence groups.

According to a tenth embodiment of the second example, selecting the spreading sequence group is based on at least one of: a network access device receiving type and/or capability; traffic load; traffic characteristics; signal to interference and noise ratio; interference to noise ratio; and signal to interference ratio.

According to a eleventh embodiment of the second example, a number of spreading sequences in the spreading sequence group is based on at least one of: a maximum number of allowed streams used by the transmitter; a usage scenario for the transmitted NoMA signal; a receiver type and capability; a range of supporting transmission block size (TBS); a range of supporting modulation and coding scheme (MCS); and signaling overhead.

According to a twelfth embodiment of the second example, the spreading sequence group is a first spreading sequence group of a plurality of spreading sequence groups, the plurality of spreading sequence groups further comprising a second spreading sequence group.

According to a thirteenth embodiment of the second example, each spreading sequence in the first spreading sequence group has a same first sparsity ratio, and each spreading sequence in the second spreading sequence group has a same second sparsity ratio different from the first sparsity ratio.

According to a fourteenth embodiment of the second example, the first sparsity ratio corresponds to: a spreading sequence having only one non-zero element; a spreading sequence having at least two non-zero elements and at least one zero element; or a spreading sequence having no zero elements.

According to a fifteenth embodiment of the second example, the fifteenth embodiment further comprising: receiving, by the transmitter, a starting index for the first spreading sequence; and at least one of: a direction of increasing index or decreasing index to identify the second spreading sequence; and a hopping pattern of spreading sequence indices.

According to a sixteenth embodiment of the second example, the sixteenth embodiment further comprising: generating a pool of discrete Fourier transform (DFT) spreading sequences using a fast Fourier transform (FFT) algorithm, the pool of spreading sequences including at least one group and each group including at least one spreading sequence, wherein at least one of: the at least one group of spreading sequences are grouped based on characteristics of the spreading sequences; and the spreading sequences are arranged in a particular order with the respective groups based on a performance metric of a transmission characteristic.

According to a seventeenth embodiment of the second example, spreading sequences in the pool of spreading sequences are arranged in a tabular look-up table.

According to a eighteenth embodiment of the second example, each spreading sequence has an associated index.

According to a nineteenth embodiment of the first example, at least one spreading sequence is arranged in a group in the look-up table, the look-up table comprising one or more groups, and each group has an associated index.

According to a third example of the disclosure, there is provided an apparatus comprising: a processor; and a non-transitory computer readable storage medium storing programming for execution by the processor, the programming including instructions to: obtain, by the apparatus, an indication of a spreading sequence from a pool of spreading sequences, each spreading sequence in the pool of spreading sequences having a corresponding association with a transmission metric for said each spreading sequence; spreading, by the apparatus, a sequence of modulated symbols using the spreading sequence corresponding to the obtained indication, to generate a sequence of spread symbols; mapping, by the apparatus, the sequence of spread symbols to a set of resource elements, to generate a set of resource-mapped symbols; and transmitting, by the apparatus to a receiver, a non-orthogonal multiple access (NoMA) signal generated from the set of resource-mapped symbols.

According to a fourth example of the disclosure, there is provided an apparatus comprising: a processor; and a non-transitory computer readable storage medium storing programming for execution by the processor, the programming including instructions to: obtain, by the apparatus, an indication of a spreading sequence group, the spreading sequence group comprising a subset of a pool of spreading sequences, each spreading sequence of the subset related to the other spreading sequences of the subset by a correlation factor less than a threshold correlation factor; spread, by the apparatus, a first sequence of modulated symbols using a first spreading sequence of the spreading sequence group corresponding to the obtained indication, to generate a first sequence of spread symbols; spread, by the apparatus, a second sequence of modulated symbols using a second spreading sequence of the spreading sequence group corresponding to the obtained indication, to generate a second sequence of spread symbols; map, by the apparatus, the first and second sequences of spread symbols to a set of resource elements, to generate a set of resource-mapped symbols; and transmit, by the apparatus to a receiver, a non-orthogonal multiple access (NoMA) signal generated from the set of resource-mapped symbols.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method comprising:
obtaining, by a transmitter, an indication of a group of N spreading sequences, the N spreading sequences in the group being from a pool of spreading sequences in which at least two spreading sequences in the pool are non-orthogonal, wherein each of the N spreading sequences in the group are orthogonal to one another, and wherein N is an integer greater than one;
spreading, by the transmitter, a group of N sequences of modulated symbols using the group of N spreading sequences to generate a group of N sequences of spread symbols;
summing, by the transmitter, the group of N sequences of spread symbols to generate an output symbol sequence;
mapping, by the transmitter, the output symbol sequence to a set of resource elements to generate a set of resource-mapped symbols;

generating, by the transmitter, a non-orthogonal multiple access (NoMA) signal from the set of resource-mapped symbols; and transmitting, by the transmitter to a receiver, the NoMA signal, wherein the group of N sequences of spread symbols is power adjusted before the summing, wherein the group of N spreading sequences includes N sparse spreading sequences, or N non-sparse spreading sequences, or M sparse spreading sequences and (N-M) non-sparse spreading sequences, wherein the pool of spreading sequences is grouped based on a first characteristic of the pool of spreading sequences, wherein the group of N spreading sequences is selected from the pool based on the first characteristic and based on at least one of a network access device receiving type or capability, traffic load, traffic characteristics, signal to interference and noise ratio, interference to noise ratio, or signal to interference ratio, wherein the group of N spreading sequences is sub-grouped into a plurality of sub-groups of spreading sequences based on a second characteristic of the group of N spreading sequences different from the first characteristic, wherein the N spreading sequences in the group are ordered by an ascending order or a descending order of at least one of a performance metric, a cubic metric (CM), or a peak to average power ratio (PAPR), wherein a first quantity of the N spreading sequences in the group is different from a second quantity of M spreading sequences in a second group, and wherein a number of groups in the pool of spreading sequences is based on a sequence type of the pool of spreading sequences.

2. The method of claim 1, wherein the spreading comprises:
spreading, by the transmitter, a first sequence of modulated symbols using a first spreading sequence of the group of N spreading sequences corresponding to the indication, to generate a first sequence of spread symbols; and
spreading, by the transmitter, a second sequence of modulated symbols using a second spreading sequence of the group of N spreading sequences corresponding to the indication, to generate a second sequence of spread symbols.

3. The method of claim 1, wherein, in the group of N spreading sequences, the N spreading sequences are ordered in a direction of increasing or decreasing value of a transmission metric associated with a respective spreading sequence.

4. The method of claim 3, wherein the transmission metric is a performance metric that is at least one of:
cubic metric (CM);
peak to average power ratio (PAPR);
reliability including block error rate (BLER);
transmission block size (TBS);
modulation and coding scheme (MCS);
overloading capability;
receiver capability;
allocated bandwidth;
maximum coupling loss (MCL) range; or
number of active user equipments (UEs).

5. The method of claim 2, wherein the group of N spreading sequences and respective spreading sequences in the group are each identified by a respective index value.

6. The method of claim 5, further comprising:
receiving, by the transmitter, a starting index for the first spreading sequence and at least one of:
a direction of increasing index or decreasing index to identify the second spreading sequence, or
a hopping pattern of spreading sequence indices.

7. The method of claim 1, wherein the indication further indicates at least one of:
a type of spreading sequence to be used by the transmitter;
a number of spreading sequences per group;
a number of groups of spreading sequences;
a performance metric; or
a user equipment (UE) identifier (ID).

8. The method of claim 1, wherein the obtaining the indication comprises:
selecting, by the transmitter, the group of N spreading sequences from the pool of spreading sequences.

9. The method of claim 8, wherein the selecting is based on at least two of:
the network access device receiving type or capability;
the traffic load;
the traffic characteristics;
the signal to interference and noise ratio;
the interference to noise ratio; or the signal to interference ratio.

10. The method of claim 2, wherein the first spreading sequence and the second spreading sequence have at least one of:
are both associated with a same spreading factor;
are associated with different spreading factors;
are both associated with a same sparsity ratio; or
are both associated with different sparsity ratios.

11. The method of claim 1, wherein each spreading sequence in the pool of spreading sequences has a corresponding association with a user equipment (UE) identifier (ID), and wherein the obtaining the indication comprises:
selecting the group of N spreading sequences based the UE ID.

12. The method of claim 1, wherein the group of N spreading sequences is grouped based on a type of spreading sequence, wherein the type of spreading sequence is at least one of:
a spreading sequence having only one non-zero element;
a spreading sequence having at least two non-zero elements and at least one zero element; or
a spreading sequence having no zero elements.

13. The method of claim 1, further comprising:
generating a pool of discrete Fourier transform (DFT) spreading sequences using a fast Fourier transform (FFT) algorithm, the pool of spreading sequences including a plurality of groups and each group of the plurality of groups including at least one spreading sequence,
wherein the generating further comprises grouping spreading sequences based on at least one of:
characteristics of the N spreading sequences; or
spreading sequences in the plurality of groups are non-orthogonal with respect to at least one other spreading sequence in the pool, and each of the N spreading sequences in the plurality of groups are orthogonal to one another.

14. An apparatus comprising:
at least one processor; and
a non-transitory computer readable storage medium storing programming for execution by the at least one processor, the programming including instructions to:

obtain an indication of a group of N spreading sequences, the N spreading sequences in the group being from a pool of spreading sequences in which at least two spreading sequences in the pool are non-orthogonal, wherein each of the N spreading sequences in the group are orthogonal to one another, and wherein N is an integer greater than one;

spread a group of N sequences of modulated symbols using the group of N spreading sequences to generate a group of N sequences of spread symbols;

sum the group of N sequences of spread symbols to generate an output symbol sequence;

map the output symbol sequence to a set of resource elements to generate a set of resource-mapped symbols;

generate a non-orthogonal multiple access (NoMA) signal from the set of resource-mapped symbols; and transmit, to a receiver, the NoMA signal, wherein the group of N sequences of spread symbols is power adjusted before the summing, wherein the group of N spreading sequences includes N sparse spreading sequences, or N non-sparse spreading sequences, or M sparse spreading sequences and (N-M) non-sparse spreading sequences, wherein the pool of spreading sequences is grouped based on a first characteristic of the pool of spreading sequences, wherein the group of N spreading sequences is selected from the pool based on the first characteristic and based on at least one of a network access device receiving type or capability, traffic load, traffic characteristics, signal to interference and noise ratio, interference to noise ratio, or signal to interference ratio, wherein the group of N spreading sequences is sub-grouped into a plurality of sub-groups of spreading sequences based on a second characteristic of the group of N spreading sequences different from the first characteristic, wherein the N spreading sequences in the group are ordered by an ascending order or a descending order of at least one of a performance metric, a cubic metric (CM), or a peak to average power ratio (PAPR), wherein a first quantity of the N spreading sequences in the group is different from a second quantity of M spreading sequences in a second group, and wherein a number of groups in the pool of spreading sequences is based on a sequence type of the pool of spreading sequences.

15. The apparatus of claim 14, wherein the instructions to spread the group of N sequences of modulated symbols comprises instructions to:

spread a first sequence of modulated symbols using a first spreading sequence of the group of N spreading sequences corresponding to the indication, to generate a first sequence of spread symbols; and spread a second sequence of modulated symbols using a second spreading sequence of the group of N spreading sequences corresponding to the indication, to generate a second sequence of spread symbols.

16. The apparatus of claim 14, wherein, in the group of N spreading sequences, the N spreading sequences are ordered in a direction of increasing or decreasing value of a transmission metric associated with a respective spreading sequence.

17. The apparatus of claim 16, wherein the transmission metric is a performance metric that is at least one of:

cubic metric (CM);
peak to average power ratio (PAPR);
reliability including block error rate (BLER);
transmission block size (TBS);
modulation and coding scheme (MCS);
overloading capability;
receiver capability;
allocated bandwidth;
maximum coupling loss (MCL) range; or
number of active user equipments (UEs).

18. The apparatus of claim 14, wherein the group of N spreading sequences is grouped based on a type of spreading sequence, wherein the type of spreading sequence is at least one of:

a spreading sequence having only one non-zero element;
a spreading sequence having at least two non-zero elements and at least one zero element; or
a spreading sequence having no zero elements.

19. The method of claim 1, wherein the at least two spreading sequences are in two different groups.

20. The method of claim 19, wherein the pool of spreading sequences includes a second group of N spreading sequences, and wherein the second group of N spreading sequences includes at least one spreading sequence that is orthogonal to the each of the N spreading sequences in the group.

* * * * *